United States Patent
Kato et al.

(10) Patent No.: US 9,304,789 B2
(45) Date of Patent: Apr. 5, 2016

(54) VIRTUAL MACHINE CONTROL DEVICE, VIRTUAL MACHINE CONTROL METHOD, COMPUTER-READABLE RECORDING MEDIUM, AND INTEGRATED CIRCUIT

(75) Inventors: Kazuomi Kato, Kyoto (JP); Masahiko Saito, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 411 days.

(21) Appl. No.: 13/883,452

(22) PCT Filed: Aug. 3, 2012

(86) PCT No.: PCT/JP2012/004961
§ 371 (c)(1),
(2), (4) Date: May 3, 2013

(87) PCT Pub. No.: WO2013/035246
PCT Pub. Date: Mar. 14, 2013

(65) Prior Publication Data
US 2013/0232493 A1 Sep. 5, 2013

(30) Foreign Application Priority Data
Sep. 7, 2011 (JP) .................................. 2011-194513

(51) Int. Cl.
*G06F 9/455* (2006.01)
*G06F 1/32* (2006.01)
*G06F 9/48* (2006.01)

(52) U.S. Cl.
CPC .............. *G06F 9/455* (2013.01); *G06F 1/3228* (2013.01); *G06F 9/4893* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 7,120,911 B1 | 10/2006 | Katayama | |
| 8,862,914 B2 * | 10/2014 | Kansal et al. | 713/320 |
| 2006/0085794 A1 | 4/2006 | Yokoyama | |
| 2011/0093836 A1 * | 4/2011 | Galicia et al. | 717/139 |

FOREIGN PATENT DOCUMENTS

| | | |
|---|---|---|
| EP | 1 134 656 | 9/2001 |
| JP | 2001-43098 | 2/2001 |
| JP | 2001-256067 | 9/2001 |
| JP | 2006-113767 | 4/2006 |

OTHER PUBLICATIONS

International Search Report issued Aug. 28, 2012 in International (PCT) Application No. PCT/JP2012/004961.

* cited by examiner

*Primary Examiner* — Mengyao Zhe
(74) *Attorney, Agent, or Firm* — Wenderoth, Lind & Ponack, L.L.P.

(57) ABSTRACT

A pseudo task generation requester 200 generates a request for generating a pseudo task 283 indicating that a certain one of CPUs is in an use state, and notifies a second OS 125 of the generation request, in the case where a task to be processed by a first virtual machine 110 is assigned to the one CPU, but a task to be processed by a second virtual machine 120 is not assigned to the one CPU. A pseudo task finishing requester 206 finishes the pseudo task 283 when a task in the first virtual machine 110 is finished with respect to the CPU to which the pseudo task 283 is assigned.

15 Claims, 13 Drawing Sheets

FIG. 3

VIRTUAL MACHINE EXECUTION STATE MANAGEMENT INFORMATION: 224

|      | VIRTUAL MACHINE TO WHICH RIGHT OF EXECUTION IS ASSIGNED | EXECUTION STATE OF FIRST VIRTUAL MACHINE | EXECUTION STATE OF SECOND VIRTUAL MACHINE |
|------|---------------------------------------------------------|------------------------------------------|-------------------------------------------|
| CPU0 | SECOND VIRTUAL MACHINE                                  | (NOT ASSIGNABLE)                         | TASK EXISTING STATE                       |
| CPU1 | SECOND VIRTUAL MACHINE                                  | (NOT ASSIGNABLE)                         | IDLE STATE                                |
| CPU2 | SECOND VIRTUAL MACHINE                                  | (NOT ASSIGNABLE)                         | TASK EXISTING STATE                       |
| CPU3 | SECOND VIRTUAL MACHINE                                  | IDLE STATE                               | TASK EXISTING STATE                       |

FIG. 4

INTERRUPT PENDING INFORMATION: 221

|       | INTERRUPT NUMBER OF GENERATED INTERRUPT | DESTINATION VIRTUAL MACHINE | DESTINATION CPU |
|-------|-----------------------------------------|-----------------------------|-----------------|
| 401 { | IRQ6                                    | SECOND VIRTUAL MACHINE      | CPU3            |
|       | IRQ5                                    | FIRST VIRTUAL MACHINE       | CPU1            |
|       | IRQ2                                    | FIRST VIRTUAL MACHINE       | CPU2            |
| 402 { | IRQ7                                    | SECOND VIRTUAL MACHINE      | CPU3            |

FIG. 5

ASSIGNABLE CPU INFORMATION: 223

|  | CPU TO WHICH RIGHT OF EXECUTION IS ASSIGNABLE |
|---|---|
| FIRST VIRTUAL MACHINE | CPU3 |
| SECOND VIRTUAL MACHINE | CPU0,CPU1,CPU2,CPU3 |

FIG. 6

SCHEDULE POLICY MANAGEMENT INFORMATION: 222

601

| SCHEDULE POLICY | FIXED PRIORITY |
|---|---|
| DEGREE OF PRIORITY OF VIRTUAL MACHINE | FIRST VIRTUAL MACHINE: 1<br>SECOND VIRTUAL MACHINE: 0 |

602

| SCHEDULE POLICY | TIME SHARING |
|---|---|
| DEGREE OF PRIORITY OF VIRTUAL MACHINE | FIRST VIRTUAL MACHINE: 2<br>SECOND VIRTUAL MACHINE: 2 |

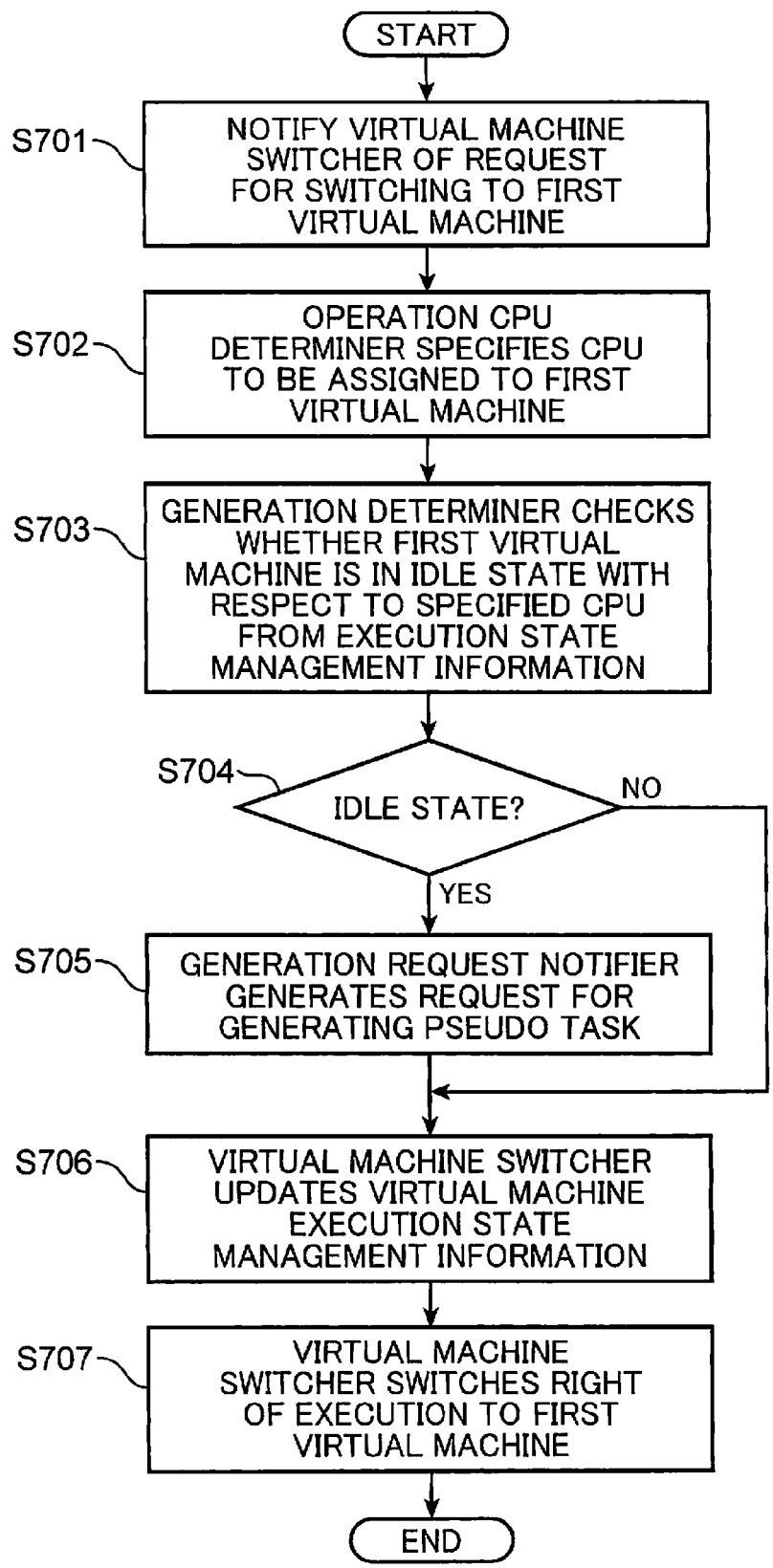

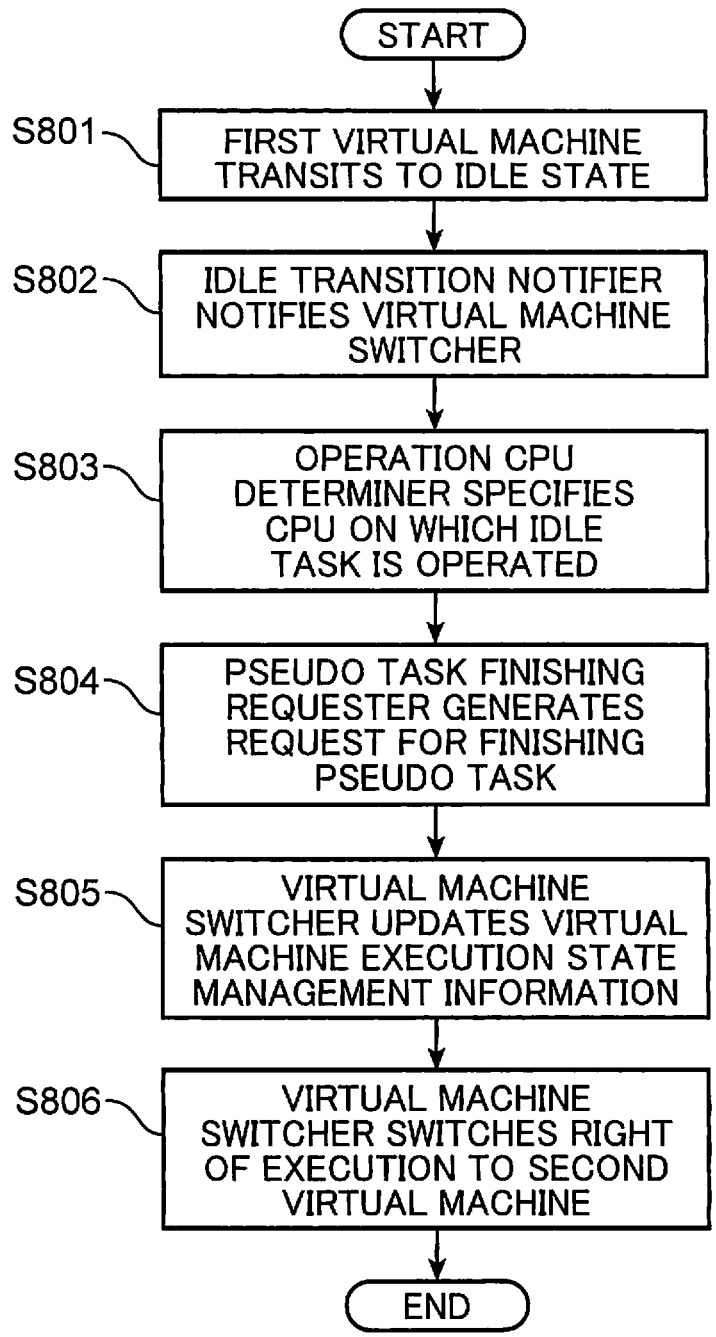

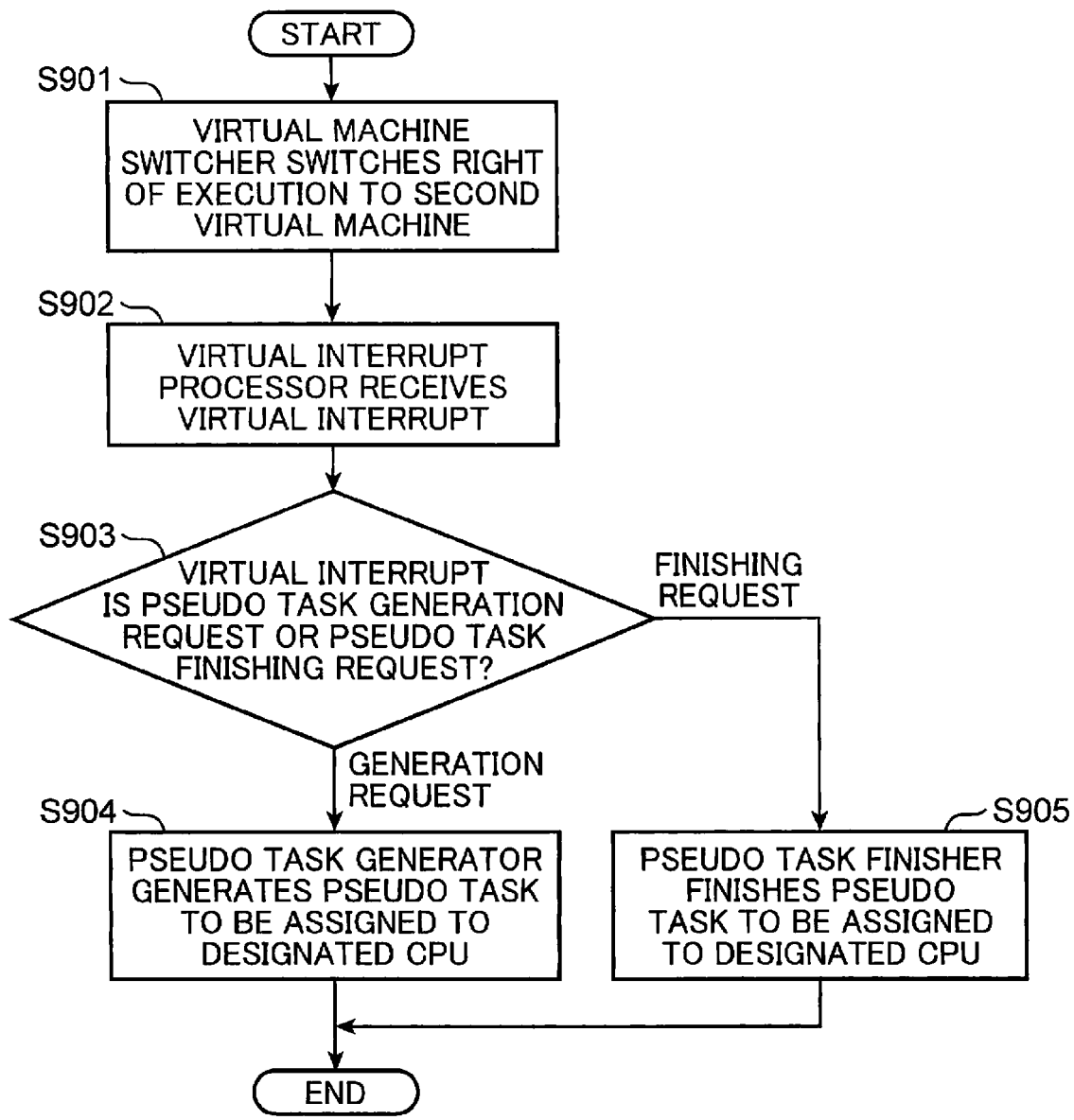

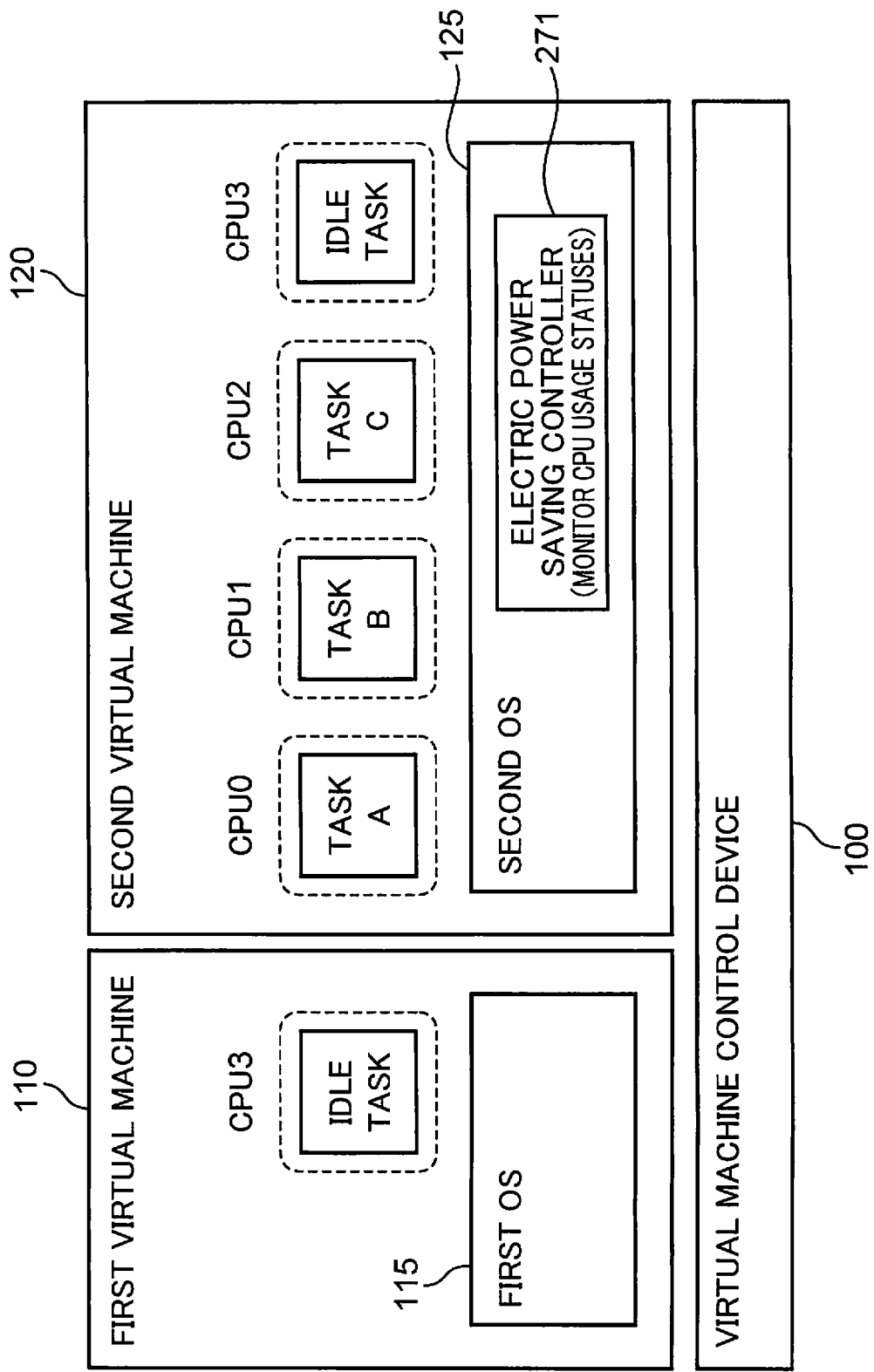

VIRTUAL MACHINE CONTROL DEVICE, VIRTUAL MACHINE CONTROL METHOD, COMPUTER-READABLE RECORDING MEDIUM, AND INTEGRATED CIRCUIT

TECHNICAL FIELD

The present invention relates to a technology of appropriately performing electric power saving control of processors in a virtual machine system provided with a number of virtual machines.

BACKGROUND ART

In recent years, there has been known a virtual machine system provided with a number of virtual machines for operating the operating systems individually, and a virtual machine control device for controlling the virtual machines. For instance, patent literature 1 discloses a virtual machine system configured in such a manner that request contents from a number of operating systems are managed to thereby reduce the electric power consumption.

More specifically, the virtual machine system disclosed in patent literature 1 is a virtual machine system for executing a number of operating systems. The virtual machine system includes storage means for storing execution information including execution states of hardware devices in the operating systems. The virtual machine system further includes request receiving means for receiving at least one of a power-on request and a power-off request with respect to a hardware device. The virtual machine system further includes power source switching control means configured to control execution of processes relating to requests based on the execution information. The power source switching control means is configured in such a manner that a process for a power-on request or a process for a power-off request is not executed during use of a certain hardware device by the other operating system, in the case where a target operating system issues a power-on request and a power-off request to the hardware device.

However, in the virtual machine system disclosed in patent literature 1, a virtual machine control device capable of managing each of the operating systems performs electric power saving control, while managing an execution state of each of the operating systems with respect to a hardware device, and power on-off requests.

In other words, in the configuration of patent literature 1, it is necessary to provide an electric power saving function in the virtual machine control device, in addition to the electric power saving function in the operating systems.

CITATION LIST

Patent Literature

Patent literature 1: JP 2001-43098A

SUMMARY OF INVENTION

In view of the above, an object of the invention is to provide a virtual machine control device and the like configured to appropriately perform electric power saving control of the entirety of a virtual machine system, utilizing an electric power saving function of an operating system, without holding a complicated electric power saving function in the virtual machine control device.

A virtual machine control device according to an aspect of the invention is a virtual machine control device for controlling a first virtual machine and a second virtual machine, the first virtual machine and the second virtual machine being configured in such a manner that one or more processors are assigned to the first virtual machine, a first operating system is operative in the first virtual machine, one or more processors are assigned to the second virtual machine, and a second operating system is operative in the second virtual machine. The second operating system is provided with an electric power saving controller which controls supply of electric power to the processors, based on usage statuses of the processors. The virtual machine control device includes a pseudo task generation requester which notifies the second operating system of a request for generating a pseudo task indicating that a certain one of the processors is in a use state, in the case where a task to be processed by the first virtual machine is assigned to the one processor, but a task to be processed by the second virtual machine is not assigned to the one processor.

BRIEF DESCRIPTION OF DRAWINGS

FIG. 3 is a diagram showing an example of a data structure of virtual machine execution state management information;

FIG. 4 is a diagram showing an example of a data structure of interrupt pending information;

FIG. 5 is a diagram showing an example of a data structure of assignable CPU information;

FIG. 6 is a diagram showing an example of a data structure of schedule policy management information;

FIG. 7 is a flowchart showing an operation to be performed by the virtual machine control device according to the embodiment in generating a request for generating a pseudo task;

FIG. 8 is a flowchart showing an operation to be performed by the virtual machine control device according to the embodiment in generating a request for finishing a pseudo task;

FIG. 9 is a flowchart showing an operation to be performed by the virtual machine control device according to the embodiment in notifying a second OS of a request for generating a pseudo task and a request for finishing a pseudo task;

FIG. 15 is a diagram showing an example of task execution states in virtual machines of the virtual machine control device according to the embodiment.

DESCRIPTION OF EMBODIMENTS

Introductory Part to Embodiment of Invention

Figure 1:
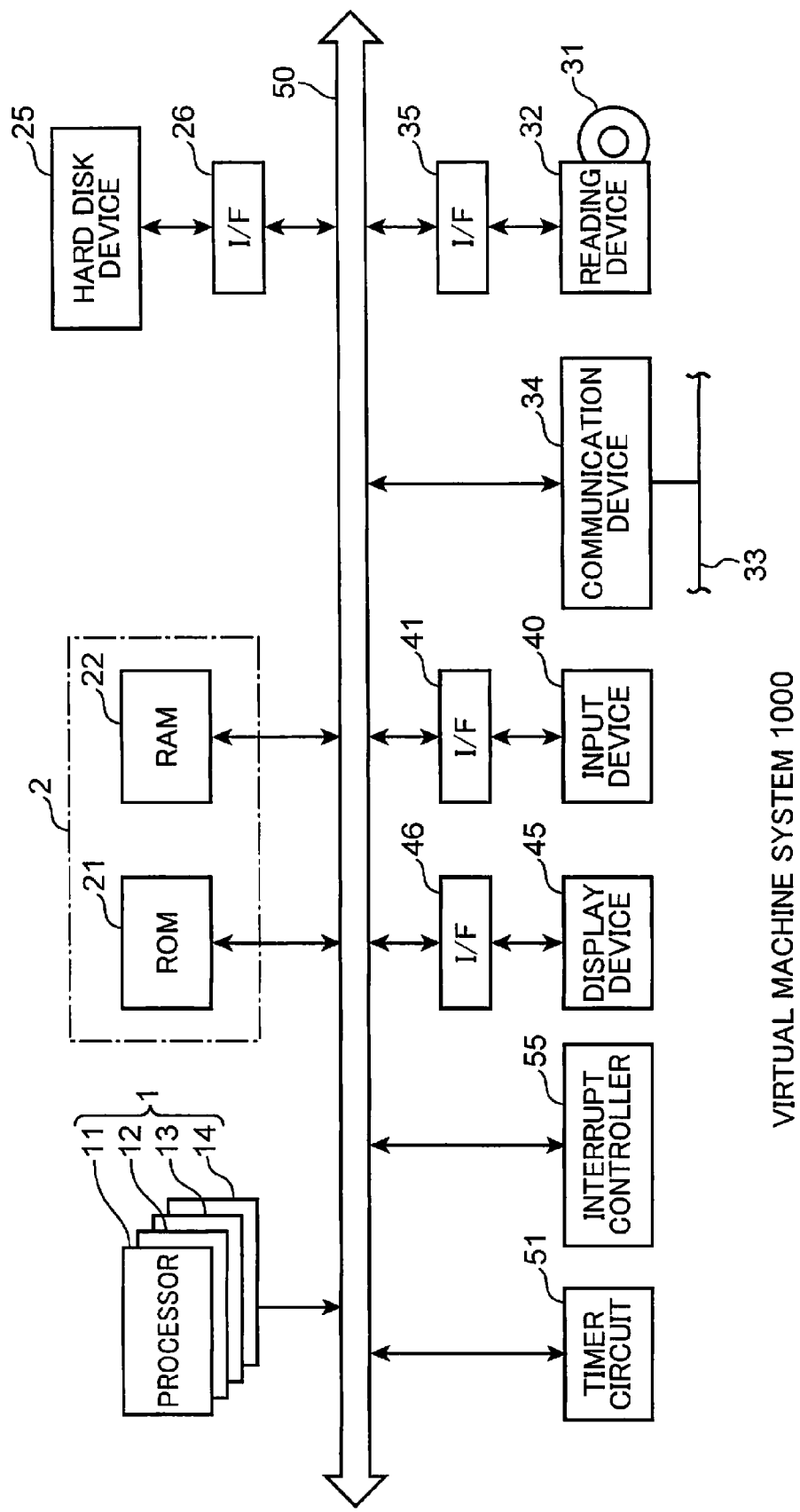
FIG. 1 is a diagram showing a configuration of a virtual machine system provided with a virtual machine control device according to an embodiment of the invention.

Generally, an operating system and a device driver are incorporated with a function for controlling electric power to be supplied to various pieces of equipment such as processors and devices. The operating system and the device driver save electric power to be consumed by an overall system by controlling electric power supply to the equipments in accordance with the conditions of the equipments. An example of the general electric power saving function is such that in the case where a piece of equipment is not used for a certain period of time or is not operated, electric power supply to the equipment is stopped, or the amount of electric power to be supplied to the equipment is lowered by lowering the frequency of a clock signal to be supplied to the equipment. Generally, an operating system is provided with such an electric power saving function. The operating system is provided with, as a part of the electric power saving function, a function of stopping the operation of a certain processor for stopping supply of electric power to the processor, in the case where the frequency of occurrences of an idle state indicating that there exists no task to be processed by the system with respect to the processor has reached a predetermined value.

On the other hand, in a virtual machine system configured to operate a number of virtual machines, each of which is constituted of an operating system and software programs to be run on the operating system, the operating system of a certain virtual machine cannot directly know a usage status of an equipment in another virtual machine. In other words, a certain virtual machine cannot directly know which processor in another virtual machine is operated, and the degree of use of the processor by the another virtual machine. Therefore, in a conventional virtual machine system, it is impossible or difficult to bring a processor to an electric power saving state at an appropriate timing, using the electric power saving function of an operating system.

Patent literature 1 described in the background art has been known as a technology relating to a conventional virtual machine control for avoiding the aforementioned drawbacks. In the configuration disclosed in patent literature 1, however, it is necessary to provide an electric power saving function in the virtual machine control device, in addition to the electric power saving function of the operating system.

It should be noted that the electric power saving function of an operating system performs a complicated electric power saving function in accordance with various conditions. For instance, the following electric power saving control is performed. Idle states indicating that there exists no task to be processed by a processor for a certain period of time are statistically sampled, and electric power supply to the processor is stopped or the frequency of a clock signal to be supplied to the processor is lowered, based on the sampling result.

Incorporating such a complicated electric power saving function of an operating system in a virtual machine control device may raise the cost relating to the development, and may give rise to an increase in maintenance cost after the development.

Further, generally, the electric power saving function of a virtual machine system has been developed and progressed in an open-source manner by e.g. developing venders of operating systems, as a function of an operating system. However, in the configuration disclosed in patent literature 1, it is necessary to hold the electric power saving function of a virtual machine control device, each time the electric power saving function of the operating system is updated.

In view of the above, an object of a virtual machine control device according to the embodiment is to implement an electric power saving function of the entirety of a virtual machine system, utilizing an electric power saving function of an operating system, without holding a complicated electric power saving function in the virtual machine control device. In the following, a virtual machine control device according to the embodiment is described in detail referring to the drawings.

(Description of Virtual Machine Control Device of Embodiment)

FIG. 1 is a diagram showing a configuration of a virtual machine system provided with a virtual machine control device according to an embodiment of the invention. The virtual machine system 1000 itself may be dedicatedly used by a user, or may be incorporated in various pieces of equipment. Representative examples of the virtual machine system 1000 include general-purpose computers such as PCs (Personal Computers). The invention is not limited to the above. For instance, the virtual machine system 1000 may be mobile communication terminals such as PDAs (Personal Digital Assistances), mobile phones, or smartphones. In addition to the above, the virtual machine system 1000 may be televisions, hard disk recorders, various disc recorders using e.g. DVDs and blu-ray discs, various disc players using e.g. DVDs and blu-ray discs, or car navigation systems.

The virtual machine system 1000 is provided with a processor 1, a memory device 2, a communication device 34, an input device 40, a display device 45, a timer circuit 51, and an interrupt controller 55. These devices are connected to each other by way of a bus line 50. Further, it is possible to connect a hard disk device 25 and a reading device 32 to the bus line 50, as necessary. The hard disk device 25, the reading device 32, the input device 40, and the display device 45 are respectively connected to the bus line 50 via interfaces 26, 35, 41, and 46.

Representative examples of the processor 1 include arithmetic processing devices such as CPUs (Central Processing Units), processors for media processing or for graphics processing, and DSPs (Digital Signal Processors).

The processor 1 may be configured of a single processor, or may be configured of a certain number of processors. Let it be assumed that the virtual machine system 1000 has processors 11, 12, 13, and 14. In the example shown in FIG. 1, four processors are illustrated. It is needless to say that the number of the processors 1 is not limited to the above. The memory device 2 is provided with an ROM (Read Only Memory) 21 and an RAM (Random Access Memory) 22. The ROM 21 stores therein a computer program for defining the operations of the processor 1, and data. The computer program and the data may be stored in the hard disk device 25. The processor 1 writes, into the RAM 22, the computer program and data stored in the ROM 21 or in the hard disk device 25, as necessary, and executes a process to be defined by the computer program. The RAM 22 also functions as a medium for temporarily storing data to be generated in the course of executing a process by the processor 1. The ROM 21 includes a non-volatile memory, e.g. a flash ROM, capable of writing and holding storage contents, even if the power source of the system is turned off, and a storage medium. The RAM 22 includes a volatile memory incapable of holding storage contents, if the power source of the system is turned off, and a storage medium.

The hard disk device 25 is a device configured to write and read a computer program or data to and from an unillustrated built-in hard disk. The reading device 32 is a device configured to read a computer program or data recorded in a recording medium 31 (e.g. CD, DVD, and a memory card). The communication device 34 is a device configured to exchange a computer program or data with respect to an external device through a communication line 33 such as a telephone line, a network line, radio, Bluetooth™, or infrared communication. The input device 40 is a device configured to input e.g. data and input events by user's manipulation. For instance, the input device 40 is a keyboard disposed in a PDA, input buttons disposed in a mobile phone, a touch panel, an attachable/detachable mouse, or a keyboard. The display device 45 is a device configured to display e.g. data or an image on a screen, or to output e.g. data by a sound. Examples of the display device 45 include LCDs (Liquid Crystal Displays), organic ELs (Electro-Luminescences), cathode ray tubes, and speakers.

The timer circuit 51 is a device configured to output a timer interrupt signal at a predetermined cycle. The interrupt controller 55 is a device configured to relay, to the processor 1, an interrupt request signal to be transmitted from e.g. the timer circuit 51, the input device 40, the processor 1, the communication device 34 as a network device, the hard disk device 25, and the reading device 32. A certain degree of priority is assigned to an interrupt request from each of the devices. The interrupt controller 55 has a function of adjusting interrupt requests in accordance with the degrees of priority thereof, in the case where an interrupt has occurred in two or more devices simultaneously.

As described above, the virtual machine system 1000 is configured as a computer. The computer program is suppliable through the ROM 21, the hard disk device 25, an unillustrated flexible disc, the computer-readable recording medium 31 such as a CD-ROM, or is suppliable through a transmission medium such as the communication line 33. For instance, it is possible to read out a computer program recorded in the recording medium 31 (CD-ROM) by connecting the reading device 32 to the virtual machine system 1000. Further, the readout computer program can be stored in the RAM 22 or in the hard disk device 25.

In the case where a computer program is supplied from the ROM 21 as a program recording medium, the processor 1 is operable to execute a process in accordance with the computer program by loading the ROM 21 in the virtual machine system 1000. The computer program to be supplied through a transmission medium such as the communication line 33 is received through the communication device 34, and stored e.g. in the RAM 22 or in the hard disk device 25. The transmission medium is not limited to a wired transmission medium, but may be a wireless transmission medium. Further, the transmission medium is not limited to a communication line, but may include a relay device for relaying via a communication line, for instance, a router.

Normally, the entirety of a virtual machine control device is implemented by storing the entity of the virtual machine control device in the memory device 2 or in the hard disk device 25 and by executing a process in cooperation with the processor 1.

In the above configuration, the virtual machine control device can be implemented as e.g. a program which is run on the virtual machine system 1000. For instance, referring to FIG. 1, a program and data constituting the virtual machine control device are stored in the memory device 2, and operated by being processed by the processor 1. The virtual machine control device may also be called a virtual machine monitor or a hypervisor.

Figure 2:
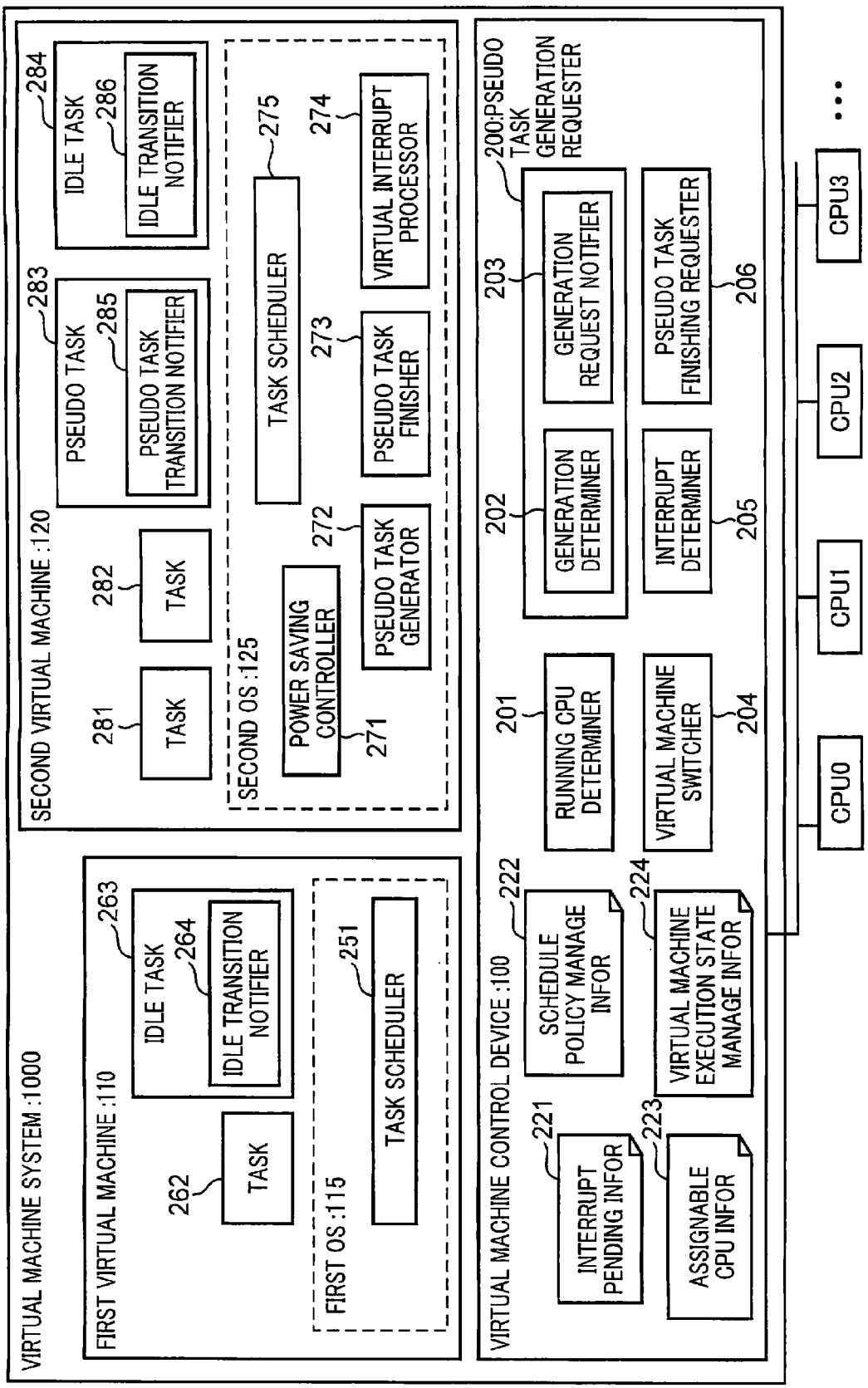
FIG. 2 is a block diagram showing an example of a functional configuration of the virtual machine system provided with the virtual machine control device according to the embodiment of the invention.

FIG. 2 is a block diagram showing an example of a functional configuration of the virtual machine control device 100 according to the embodiment of the invention. In the example shown in FIG. 2, the virtual machine control device 100 controls two virtual machines. One of the virtual machines is a first virtual machine 110, and the other thereof is a second virtual machine 120. In the example shown in FIG. 2, a first OS (operating system) 115 runs on the first virtual machine 110, and a second OS 125 runs on the second virtual machine 120. Here, the first OS 115 and the second OS 125 respectively may be operating systems of different types, operating systems of a same type but of different versions, or operating systems of a same type and of a same version. Referring to FIG. 2, CPU0 through CPU3 are examples of the processors 11 through 14 shown in FIG. 1.

Further, in the example shown in FIG. 2, the second OS 125 of the second virtual machine 120 is provided with an electric power saving controller 271. Generally, an operating system is provided with a function of reducing electric power consumption by controlling electric power to be supplied to an equipment. In a general virtual machine system, a number of operating systems are operated. Accordingly, a number of electric power saving functions of the operating systems may be operated. An electric power saving function is configured to control supply of electric power to processors such as CPUs and to various devices. Accordingly, in the case where the electric power saving functions of the operating systems are operated, demands for electric power control compete with each other. In order to avoid such a condition, there is used a method for causing an operating system of one of the virtual machines to perform electric power saving control.

The embodiment is configured in such a manner that an electric power saving function is not provided in the first OS 115, and the second OS 125 performs electric power saving control. As an example of a configuration of causing the second OS 125 to perform electric power saving control, it is possible to use a method for invalidating the electric power saving function of the first OS 115.

In the virtual machine control device 100 shown in FIG. 2, the virtual machine control program includes interrupt pending information 221 through virtual machine execution state management information 224. These informations are loaded and held in a storage device such as an RAM. Further, in the virtual machine control device 100, the virtual machine program also includes a pseudo task generation requester 200 through a pseudo task finishing requester 206. These functions are executed and implemented by CPUs.

Firstly, a configuration of the first virtual machine 110 is described.

The first virtual machine 110 is provided with the first OS 115, zero or more tasks as processing units as exemplified by a task 262, and an idle task 263. The first OS 115 is provided with a task scheduler 251. The idle task 263 is provided with an idle transition notifier 264.

Here, a task indicates a unit of a program to be executed, which is generally assigned to a CPU by an operating system. The task is also called a process or a thread. Hereinafter, tasks other than an idle task and a pseudo task are simply called as tasks.

In the example shown in FIG. 2, the first virtual machine 110 has only the task 262 as a task or tasks other than an idle task. Alternatively, a number of tasks may exist, or no task other than the idle task 263 may exist in the first virtual machine 110.

The idle task 263 is regarded, by the task scheduler 251, as a task having a lowest degree of priority as compared with the task 262. The idle task 263 is a task to be scheduled to belong to a certain CPU, in the case where there is no task to be processed by the first virtual machine 110 with respect to the CPU. In other words, the idle task 263 is a task to be executed in the case where there is no task to be processed by the first virtual machine 110 with respect to a certain CPU, namely, in the case where the first virtual machine 110 is in an idle state with respect to the CPU. In the case where the idle task 263 is executed, it is possible to determine that the CPU on which the idle task 263 is operated does not have a specific process to be executed in the first virtual machine 110 at the point of time.

In response to allocation of the right of execution of a certain CPU by the task scheduler 251, the idle transition notifier 264 in the idle task 263 notifies the virtual machine control device 100 that the first virtual machine 110 is brought to an idle state. The idle task 263 is not required to perform a process other than the above. Generally, the idle task 263 may be loaded with a program configured to issue a command of waiting for an interrupt to a CPU, or a program configured to wait for an interrupt to a CPU in a busy loop.

The task scheduler 251 schedules a task or tasks in the first virtual machine 110 in accordance with the degree(s) of priority defined for the task(s), and allocates the task to a CPU for execution of the task.

The task scheduler 251 may allocate the task 262 in the first virtual machine 110 to any of the CPU0 through CPU3. Alternatively, the task scheduler 251 may allocate the task 262 in the first virtual machine 110 to any of the CPUs in a multiple CPU environment.

Taking an example shown in FIG. 2, for instance, in the case where the first virtual machine 110 is capable of allocating the task 262 to the CPU0 and to the CPU1, the task scheduler 251 allocates the task 262 to one of the CPU0 and the CPU1 for execution of the task 262. In the case where the first virtual machine 110 is capable of allocating the task 262 only to the CPU0, the task scheduler 251 allocates the task 262 to the CPU0 for execution of the task 262 without fail.

Next, a configuration of the second virtual machine 120 is described.

The second virtual machine 120 is provided with the second OS 125, zero or more tasks as processing units as exemplified by a task 281 and a task 282, an idle task 284, and a pseudo task 283 to be generated in accordance with a condition. The second OS 125 is provided with an electric power saving controller 271, a pseudo task generator 272, a pseudo task finisher 273, a virtual interrupt processor 274, and a task scheduler 275. The pseudo task 283 is provided with a pseudo task transition notifier 285. The idle task 284 is provided with an idle transition notifier 286.

The task scheduler 275 schedules tasks in the second virtual machine 120 in accordance with the degrees of priority defined for the tasks, and allocates the tasks to CPUs for execution of the tasks.

The task scheduler 275 allocates the tasks in the second virtual machine 120 to at least two CPUs among the CPU0 through CPU3. Specifically, let it be assumed that there are two or more CPUs allocatable by the second OS 125. Further, let it be assumed that at least one of the CPUs allocatable by the first OS 115 is also allocatable by the second OS 125.

In the example shown in FIG. 2, for instance, if the first OS 115 is capable of allocating a task only to the CPU0, the second OS 125 is capable of allocating a task to the CPU0. Further, let it be assumed that the second OS 125 is also capable of allocating a certain task to one or more CPUs other than the CPU0. e.g., to the CPU1.

Generally, virtual machines are operated independently of each other. Accordingly. OSs and tasks to be executed on the respective virtual machines cannot know the execution states of the other OSs and tasks from each other. Specifically, the second virtual machine 120 cannot know how frequently a CPU to be used by the second OS 125 is used in the first virtual machine 110.

In the example shown in FIG. 2, the second virtual machine 120 has only the task 281 and the task 282 as tasks other than an idle task and a pseudo task. Alternatively, a number of tasks may exist, or no task other than the idle task 284 may exist in the second virtual machine 120.

The idle task 284 is regarded, by the task scheduler 275, as a task having a lowest degree of priority as compared with the other tasks. The idle task 284 is a task to be scheduled to belong to a certain CPU, in the case where there is no task to be processed by the second virtual machine 120 with respect to the CPU. In other words, the idle task 284 is a task to be executed in the case where there is no task to be processed by the second virtual machine 120 with respect to a certain CPU, namely, in the case where the second virtual machine 120 is in an idle state with respect to the CPU. In the case where the idle task 284 is executed, it is possible to determine that the CPU on which the idle task 263 is operated does not have a specific process to be executed in the second virtual machine 120 at the point of time.

In response to allocation of the right of execution of a certain CPU by the task scheduler 275, the idle transition notifier 286 in the idle task 284 notifies the virtual machine control device 100 that the second virtual machine 120 is brought to an idle state. The idle task 284 is not required to perform a process other than the above. Generally, the idle task 284 may be loaded with a program configured to issue a command of waiting for an interrupt to a CPU, or a program configured to wait for an interrupt to a CPU in a busy loop.

The pseudo task 283 is a task indicating that a certain CPU is in a use state, in the case where a task to be processed by the first virtual machine 110 is assigned to the CPU, but a task to be processed by the second virtual machine 120 is not assigned to the CPU. In other words, the pseudo task 283 is a task configured to cause the second virtual machine 120 to recognize that a task in the first virtual machine 110 is operated on a certain CPU, in the case where a task other than the idle task 263 is operated on the CPU within the first virtual machine 110. In this configuration, the second virtual machine 120 is allowed to determine that a task in the first virtual machine 110 is operated on the CPU. This keeps the electric power saving controller 271 from bringing the CPU to an electric power saving state.

In response to allocation of the right of execution of a CPU by the task scheduler 275, the pseudo task transition notifier 285 in the pseudo task 283 notifies the virtual machine control device 100 that the pseudo task 283 has been executed on the CPU. The pseudo task 283 is not required to perform a process other than the above. Generally, the pseudo task 283 may be loaded with a program configured to issue a command of waiting for an interrupt to a CPU, or a program configured to wait for an interrupt to a CPU in a busy loop.

The second OS 125 is provided with the electric power saving controller 271, the pseudo task generator 272, the pseudo task finisher 273, and the virtual interrupt processor 274, in addition to the task scheduler 275.

The electric power saving controller 271 is configured to control supply of electric power to processors such as the CPU0 through CPU3 and to various devices. Generally, the electric power saving controller 271 knows usage statuses of processors e.g. CPUs and devices to be controlled in controlling electric power supply. For instance, in the case where an object to be controlled is a CPU, the electric power saving controller 271 may know a usage status of the CPU by monitoring the frequency of allocation of tasks to the CPU.

Specifically, the electric power saving controller 271 may know a usage status of a CPU by checking whether the CPU is operated at a predetermined operation timing, and whether the CPU is brought to an idle state at the operation timing. Alternatively, the electric power saving controller 271 may know a usage status of a CPU by calculating an idling rate indicating a ratio of an idling time period when the CPU is in an idle state, or conversely, by calculating a CPU usage rate indicating a frequency of use of the CPU. Further alternatively, the electric power saving controller 271 may know a usage status of a CPU by calculating a CPU usage rate of the second virtual machine 120 by averaging the CPU usage rates of the CPUs allocatable by the second OS 125. The above methods for knowing a usage status of a CPU are merely some examples. The electric power saving controller 271 may know a usage status of a CPU, using methods other than the above.

As described above, one of the virtual machines cannot know a usage status of a CPU in the other of the virtual machines. Therefore, in a conventional virtual machine system, even if it is determined that a certain CPU is in an idle state by the electric power saving function of an operating system in one of the virtual machines, the other of the virtual machines may be operating the CPU. Thus, in the conventional virtual machine system, it has been difficult or impossible to accurately know a usage status of a CPU or a device by each of the virtual machines, using the electric power saving function provided in an operating system. In view of the above, the embodiment is proposed to solve the above drawback by providing the pseudo task 283 as described above.

The virtual interrupt processor 274 receives information relating to an interrupt type and information necessary for processing an interrupt, which have been delivered from the virtual machine control device 100, and performs a predetermined process. For instance, the virtual interrupt processor 274 determines whether the interrupt is an interrupt indicating a request for generating the pseudo task 283, or an interrupt indicating a request for finishing the pseudo task 283, or an interrupt other than the above. In the case where the interrupt is an interrupt indicating a request for generating the pseudo task 283 or an interrupt indicating a request for finishing the pseudo task 283, the virtual interrupt processor 274 receives, from the virtual machine control device 100, CPU identification information for specifying a CPU to which the pseudo task 283 is to be assigned. Then, the virtual interrupt processor 274 notifies the pseudo task generator 272 or the pseudo task finisher 273 of the information indicating that an interrupt has occurred and the CPU identification information.

The virtual interrupt processor 274 starts an operation thereof in response to allocation of the right of execution to the second virtual machine 120 by the virtual machine switcher 204 in the virtual machine control device 100. Specifically, the virtual machine switcher 204 shifts the process thereof to the virtual interrupt processor 274 so that the virtual interrupt processor 274 is allowed to refer to the information necessary for an interrupt process in switching the right of execution of a certain CPU from the first virtual machine 110 to the second virtual machine 120. For instance, the following method may be used. Specifically, the virtual machine switcher 204 stores, in a register of a CPU, an interrupt number for specifying an interrupt and a value to be transferred from the virtual machine switcher 204 to the virtual interrupt processor 274. Then, the virtual machine switcher 204 switches the execution address of the CPU to the address of an interrupt handler provided in the virtual interrupt processor 274, referring to an interrupt vector.

Alternatively, the following method may be used. Specifically, the virtual interrupt processor 274 requests the virtual machine switcher 204 of the information relating to an interrupt, which is held in the virtual machine control device 100, in response to allocation of the right of execution by the virtual machine switcher 204. Then, in the case where there is an interrupt to be processed, the virtual interrupt processor 274 acquires the information relating to the interrupt, and processes the interrupt based on the acquired information.

The pseudo task generator 272 receives, from the virtual interrupt processor 274, a notification of a request for generating the pseudo task 283, and CPU identification information for specifying a CPU to which the pseudo task 283 is to be assigned, and generates the pseudo task 283. Specifically, the pseudo task generator 272 generates the pseudo task 283 to be assigned to a specified CPU, based on the received CPU identification information. Here, the pseudo task generator 272 sets the degree of priority of the pseudo task 283 higher than the degree of priority of the idle task 284.

Further, the pseudo task generator 272 sets the degree of priority of the pseudo task 283 lower than the degrees of priority of the task 281 and the task 282. Here, the degree of priority of the idle task 284 is set lower than the degree of priority of the pseudo task 283. Accordingly, the degree of priority of the pseudo task 283 is lower than the degrees of priority of the task 281 and the task 282, but higher than the degree of priority of the idle task 284.

The pseudo task 283 is provided with the pseudo task transition notifier 285. In response to allocation of the right of execution by the task scheduler 275, the pseudo task transition notifier 285 in the pseudo task 283 notifies the virtual machine control device 100 that the pseudo task 283 is operated.

For instance, the pseudo task generator 272 may use the following method. Specifically, the pseudo task 283 is generated, utilizing a task generation function provided in the second OS 125, and the generated pseudo task 283 is handled as an object to be scheduled by the task scheduler 275. Alternatively, the pseudo task generator 272 may use the following method. Specifically, a certain number of pseudo tasks 283 are created in advance. In the case where the pseudo task generator 272 is notified of a request for generating a pseudo task 283 from the virtual interrupt processor 274, the pseudo task generator 272 selects a pseudo task 283 corresponding to the request, based on the CPU identification information, and registers the selected pseudo task 283 in a queue (e.g. a run queue) with which the task scheduler 275 manages an object to be scheduled.

The pseudo task finisher 273 starts an operation thereof in response to receiving, from the virtual interrupt processor 274, a notification of a request for finishing the pseudo task 283, and the CPU identification information for specifying a CPU to which the pseudo task 283 is assigned. The pseudo task finisher 273 finishes the pseudo task 283 assigned to the specified CPU, based on the received CPU identification information.

For instance, the pseudo task finisher 273 may use a method for finishing the pseudo task 283 by causing the task scheduler 275 to remove the pseudo task 283 from the objects to be scheduled, utilizing the task finishing function provided in the second OS 125. Alternatively, the pseudo task finisher 273 may use a method for finishing the pseudo task 283 by selecting the pseudo task 283 based on the CPU identification information notified from the virtual interrupt processor 274, and by causing the task scheduler 275 to remove the selected pseudo task 283 from the objects to be scheduled.

Next, a configuration of the virtual machine control device 100 is described.

The virtual machine control device 100 is provided with the pseudo task generation requester 200, the running CPU determiner 201, the virtual machine switcher 204, the interrupt determiner 205, and the pseudo task finishing requester 206. Further, the virtual machine control device 100 holds and manages the interrupt pending information 221, the schedule policy management information 222, the assignable CPU information 223, and the virtual machine execution state management information 224. Further, the pseudo task generation requester 200 is provided with the generation determiner 202 and the generation request notifier 203.

In the case where a task to be processed by the first virtual machine 110 is assigned to a certain CPU, but a task to be processed by the second virtual machine 120 is not assigned to the CPU, the pseudo task generation requester 200 generates a request for generating the pseudo task 283 indicating that the CPU is in a use state, and notifies the second OS 125 of the generation request.

The running CPU determiner 201 specifies, from among the CPUs, one CPU of which the right of execution is to be assigned next by the virtual machine switcher 204. Further, the running CPU determiner 201 determines which CPU has been operated in the virtual machine before the right of execution is switched. An example of an operation to be performed by the running CPU determiner 201 will be described later.

The generation determiner 202 determines whether the pseudo task 283 is to be generated in the second virtual machine 120. Further, in the case where the generation determiner 202 determines that it is necessary to generate the pseudo task 283, the generation determiner 202 notifies the generation request notifier 203 of a demand for generating the pseudo task 283. An example of the operation to be performed by the generation determiner 202 will be described later.

Upon receiving a demand for generating the pseudo task 283 from the generation determiner 202, the generation request notifier 203 notifies the second OS 125 of a request for generating the pseudo task 283. An example of an operation to be performed by the generation request notifier 203 will be described later.

In response to receiving a request for switching the right of execution between the virtual machines, the virtual machine switcher 204 determines to which one of the virtual machines, the right of execution is to be switched, based on one of the interrupt pending information 221, the schedule policy management information 222, the assignable CPU information 223, and the virtual machine execution state management information 224, and allocates the right of execution to the determined virtual machine. An example of an operation to be performed by the virtual machine switcher 204 will be described later.

In response to acquiring an interrupt from the interrupt controller 55 shown in e.g. FIG. 1, the interrupt determiner 205 notifies the virtual machine switcher 204 so that the acquired interrupt is processed by the virtual machine, or the acquired interrupt is held and registered in the interrupt pending information 221, based on the schedule policy management information 222 and the virtual machine execution state management information 224.

In response to receiving a demand for finishing the pseudo task 283 from the virtual machine switcher 204, the pseudo task finishing requester 206 notifies the second OS 125 of a request for finishing the pseudo task 283. An example of an operation to be performed by the pseudo task finishing requester 206 will be described later.

Next, an example of an operation to be performed by the running CPU determiner 201 is described.

In the case where a certain CPU assigned to a virtual machine is brought to an idle state, and the right of execution of the CPU is transferred to the virtual machine control device 100, the running CPU determiner 201 specifies the CPU which has been brought to an idle state, and notifies the CPU identification information of the specified CPU to the virtual machine switcher 204, the generation determiner 202, the generation request notifier 203, and the pseudo task finishing requester 206.

For instance, the running CPU determiner 201 determines which one of the CPUs has been brought to an idle state in the first virtual machine 110, and notifies the pseudo task finishing requester 206 of the CPU identification information of the CPU which has been brought to an idle state.

Further, in the case where the pseudo task 283 is operated in the second virtual machine 120, and the second virtual machine 120 gives up the right of execution of a certain CPU, the control is transferred to the virtual machine control device 100. In this case, the running CPU determiner 201 specifies the CPU on which the pseudo task 283 has been operated, and notifies the virtual machine switcher 204 of the CPU identification information of the specified CPU.

Here, the running CPU determiner 201 may request each of the CPUs of a current execution state thereof, determine the execution state of each of the CPUs based on a reply from each of the CPUs, and specify the CPU on which the pseudo task 283 has been operated. Alternatively, the running CPU determiner 201 may determine the execution state of each of the CPUs, referring to the information relating to the execution state of each of the CPUs to be managed by the virtual machine control device 100, and specify the CPU on which the pseudo task 283 has been operated. The running CPU determiner 201 may check, by the aforementioned means, to which one of the CPUs, the running CPU determiner 201 is assigned within the processing routine of the running CPU determiner 201.

Next, an example of the other operation to be performed by the running CPU determiner 201 is described.

In the case where an interrupt has occurred to a certain virtual machine, the interrupt determiner 205 notifies the running CPU determiner 201 of the CPU with which the interrupt is associated. Then, the running CPU determiner 201 notifies the generation request notifier 203 of the CPU identification information of the specified CPU. Alternatively, in the case where an interrupt has occurred to a certain virtual machine, the running CPU determiner 201 may determine whether the interrupt is held, referring to the interrupt pending information 221. In the case where the interrupt is held, the running CPU determiner 201 may determine the CPU with which the held interrupt is associated, and may notify the generation request notifier 203 of the CPU identification information of the specified CPU.

Next, an example of an operation to be performed by the generation determiner 202 is described. The generation determiner 202 is operated in executing a flowchart (see FIG. 7, FIG. 10, FIG. 11, and FIG. 12 to be described later) for switching the right of execution from the second virtual machine 120 to the first virtual machine 110 by the virtual machine switcher 204. In response to acquiring the CPU identification information from the running CPU determiner 201, the generation determiner 202 checks the execution state of the first virtual machine 110 with respect to the specified CPU, referring to the virtual machine execution state management information 224.

In the case where the execution state of the first virtual machine 110 is an idle state, this means that the first virtual machine 110 will transit from an idle state to a busy state indicating that a task to be processed has been generated. In view of the above, in the case where the execution state of the first virtual machine 110 with respect to a certain CPU is an idle state in switching the right of execution of the CPU to the first virtual machine 110, the generation determiner 202 notifies the generation request notifier 203 of a demand for generating the pseudo task 283. At the time of the notification, the generation determiner 202 also notifies the generation request notifier 203 of the CPU identification information of the CPU which will transit from an idle state to a task-existing state.

FIG. 3 is a diagram showing an example of a data structure of the virtual machine execution state management information 224. In the following, an operation to be performed by the generation determiner 202 is described in detail referring to FIG. 3. The example shown in FIG. 3 illustrates the virtual machine execution state management information 224 in the case where the virtual machine system 1000 has four CPUs.

In the example shown in FIG. 3, the virtual machine execution state management information 224 manages, with respect to each of the CPUs, the virtual machine to which the right of execution is currently assigned, the execution state of the first virtual machine 110, and the execution state of the second virtual machine 120. The execution state of the first virtual machine and the execution state of the second virtual machine include "TASK EXISTING STATE" corresponding to a busy state indicating that a certain task is being executed, "IDLE STATE" indicating that there is no task to be executed, "PSEUDO TASK EXISTING STATE" indicating that the pseudo task 283 is being executed, and "NOT ALLOCATABLE" indicating that a CPU is not allocatable to the first virtual machine.

Referring to the example shown in FIG. 3, in the case where the running CPU determiner 201 notifies the generation determiner 202 of "CPU3" as the CPU identification information, the generation determiner 202 determines that it is necessary to generate the pseudo task 283, and notifies the generation request notifier 203 of a demand for generating the pseudo task 283, because the execution state of the first virtual machine is an idle state.

Next, an example of an operation to be performed by the generation request notifier 203 is described.

Figure 10:
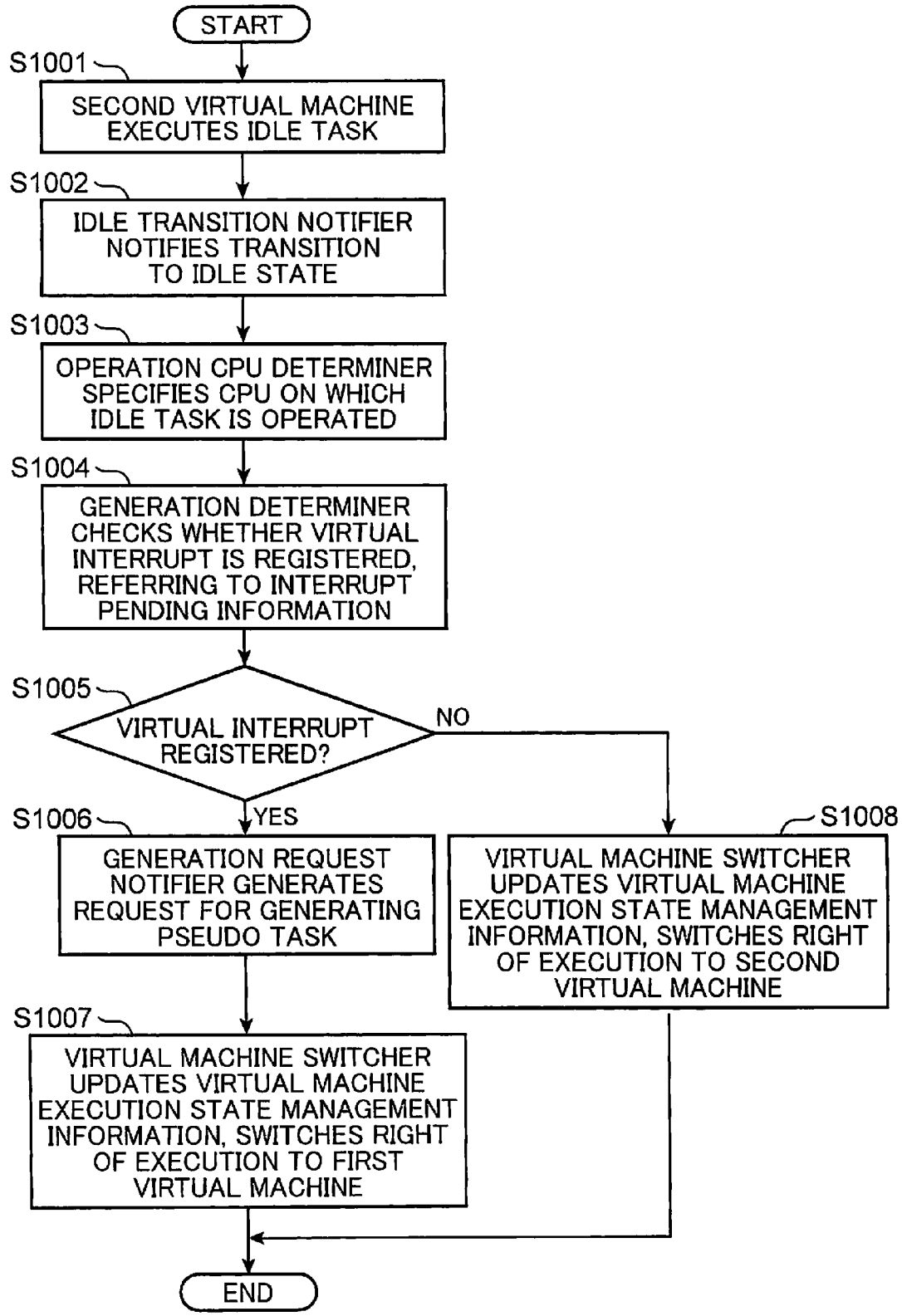
FIG. 10 is a flowchart showing an operation to be performed in generating a request for generating a pseudo task in response to transition of a second virtual machine from a busy state to an idle state.
Figure 11:
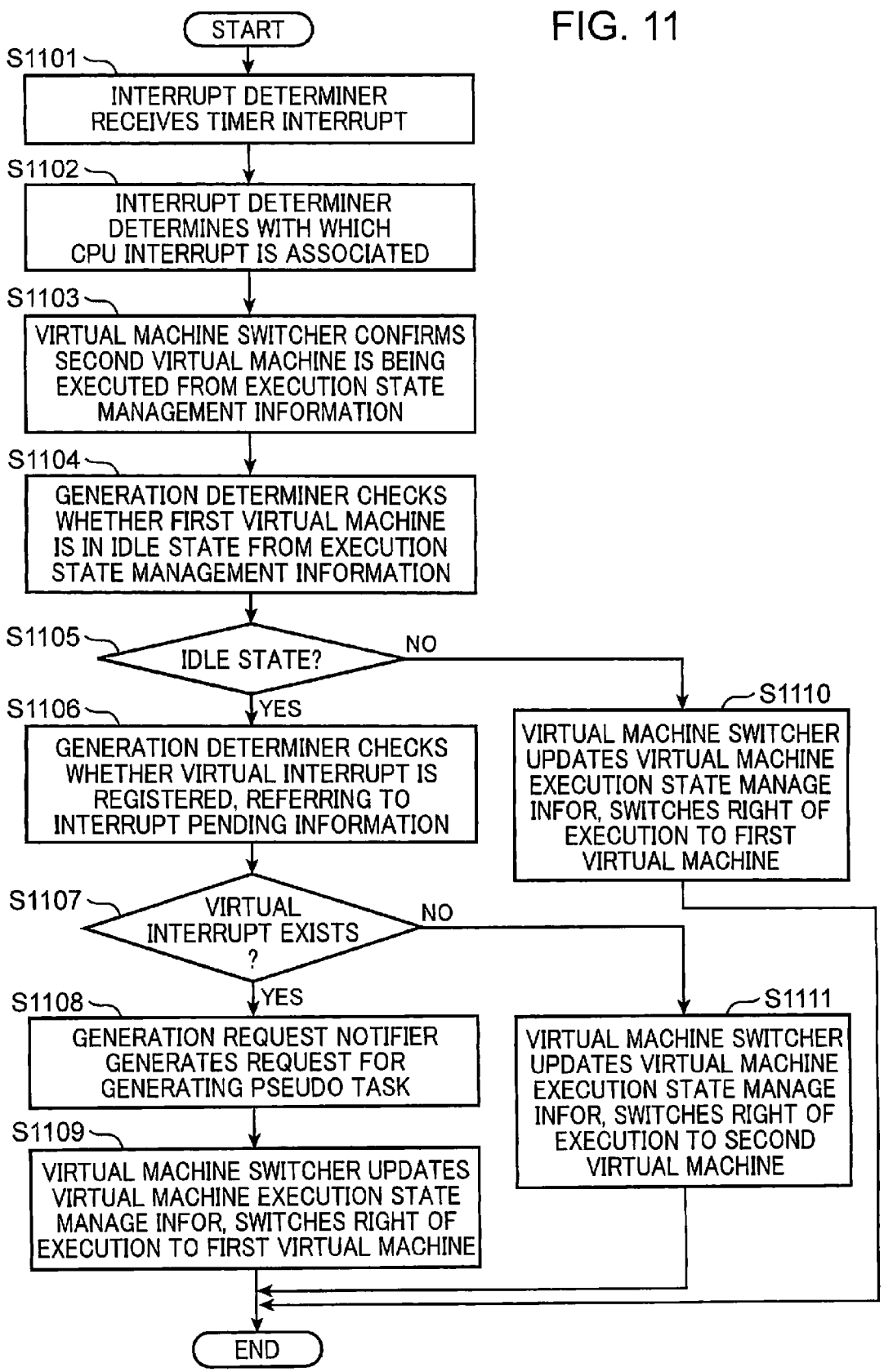
FIG. 11 is a flowchart showing a processing to be performed when the second virtual machine has used up an assigned slice of time, in the case where a time-sharing policy of allocating the right of execution between a first virtual machine and the second virtual machine in a time-sharing manner is applied.
Figure 12:
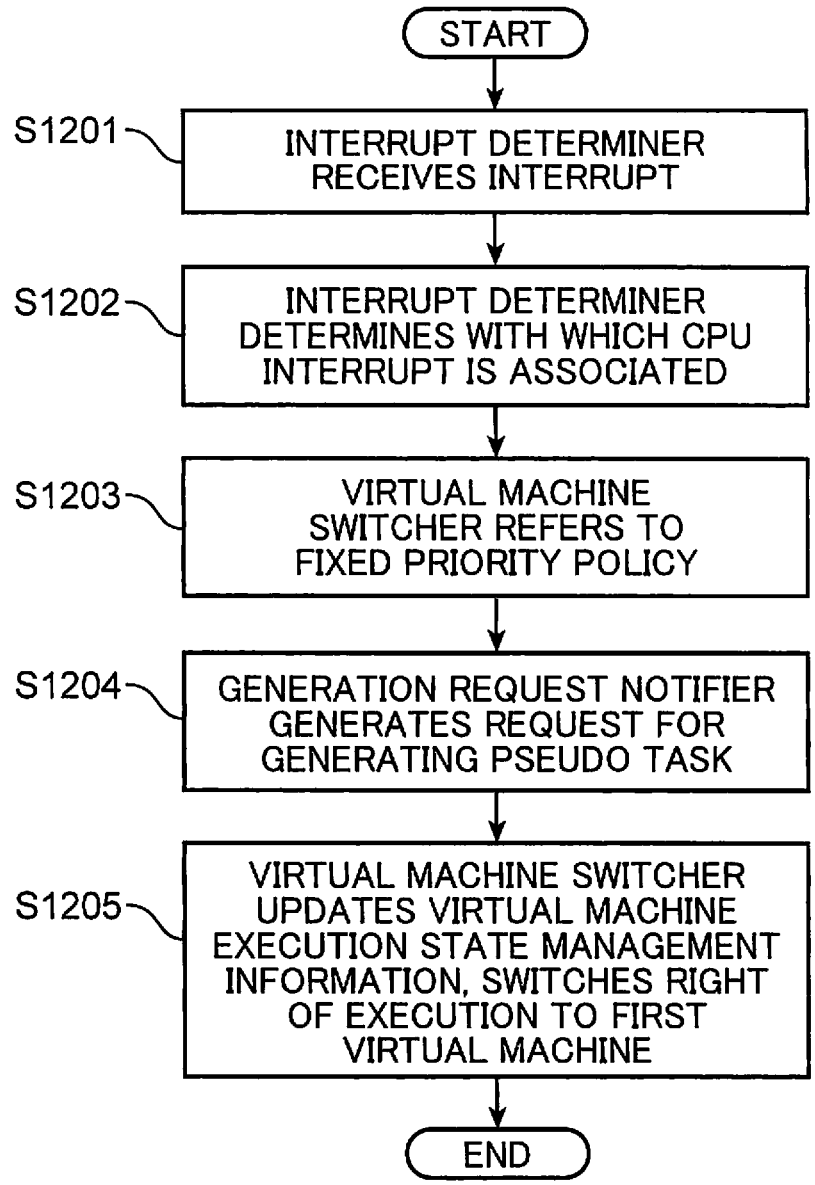
FIG. 12 is a flowchart showing a processing to be performed when an interrupt to the first virtual machine has occurred during execution of a task in the second virtual machine, in the case where a fixed priority policy of determining the right of execution between the first virtual machine and the second virtual machine is applied.

The generation request notifier 203 is operated in executing a flowchart (see FIG. 7, FIG. 10. FIG. 11, and FIG. 12 to be described later) for switching the right of execution from the second virtual machine 120 to the first virtual machine 110 by the virtual machine switcher 204. In response to receiving, from the generation determiner 202, a notification of a demand for generating the pseudo task 283 and the CPU identification information of the CPU on which the pseudo task 283 is executed, the generation request notifier 203 notifies the second OS 125 of a request for generating the pseudo task 283. Alternatively, in response to receiving, from the virtual machine switcher 204, a notification of a demand for generating the pseudo task 283 and the CPU identification information of the CPU on which the pseudo task 283 is executed, the generation request notifier 203 notifies the second OS 125 in the second virtual machine 120 of a request for generating the pseudo task 283.

The generation request notifier 203 converts the generation demand and the CPU identification information that have been notified from the generation determiner 202 or from the virtual machine switcher 204 into a format recognizable by the second OS 125, and notifies the second OS 125 of a request for generating the pseudo task 283.

Here, as a method for notifying a generation request, there is proposed a method for delivering, to the second OS 125, a virtual interrupt for generating the pseudo task 283. For instance, the interrupt number of a virtual interrupt indicating a request for generating the pseudo task 283 may be determined in advance, and the generation request notifier 203 may register, in the interrupt pending information 221 shown in FIG. 4, the interrupt number, and the CPU identification of a CPU on which the pseudo task 283 is executed.

In other words, in response to receiving a notification of a demand for generating the pseudo task 283, the generation request notifier 203 registers a virtual interrupt in the interrupt pending information 221, without immediately notifying the second OS 125 of a request for generating the pseudo task 283. Then, upon reaching a timing of switching the right of execution from the first virtual machine 110 to the second virtual machine 120, the generation request notifier 203 notifies the second OS 125 of the virtual interrupt registered in the virtual interrupt pending information 221, and notifies the second OS 125 of a request for generating the pseudo task 283.

In the above case, in response to generation of a request for finishing the pseudo task 283, the pseudo task finishing requester 206 registers, in the interrupt pending information 221, the finishing request as a virtual interrupt, and notifies the second OS 125 of the request for finishing the pseudo task 283, as a virtual interrupt, in switching the right of execution from the first virtual machine 110 to the second virtual machine 120.

Then, in the case where the request for finishing the pseudo task 283 is registered in the interrupt pending information 221 as a virtual interrupt, in notifying the request for generating the pseudo task 283, the generation request notifier 203 may delete the virtual request to thereby cancel out the generation request and the finishing request. By performing the above operation, it is possible to prevent a likelihood that the pseudo task 283 may be finished immediately after generation of the pseudo task 283. This is advantageous in reducing the processing overhead.

The invention is not limited to the above. Alternatively, the generation request notifier 203 may notify the second OS 125 of a request for generating the pseudo task 283 immediately after generation of the pseudo task 283.

FIG. 4 is a diagram showing an example of a data structure of the interrupt pending information 221. In the following, an operation to be performed by the generation request notifier 203 is described referring to FIG. 4. The interrupt pending information 221 shown in FIG. 4 is recorded with "INTERRUPT NUMBER OF GENERATED INTERRUPT" as interrupt identification information for uniquely specifying a generated interrupt, "DESTINATION VIRTUAL MACHINE" indicating a destination virtual machine to which an interrupt is to be delivered, and "DESTINATION CPU" indicating a destination CPU to which an interrupt is to be delivered. The interrupt pending information 221 may be further recorded with "INTERRUPT PRIORITY" indicating the degree of priority of an interrupt to be delivered.

For instance, let it be assumed that the interrupt number of a virtual interrupt indicating a request for generating the pseudo task 283 is IRQ6, and the CPU identification information acquired by the generation request notifier 203 is the CPU3. In this case, as exemplified by a record 401 shown in FIG. 4, "IRQ6" is registered as "INTERRUPT NUMBER OF GENERATED INTERRUPT", "SECOND VIRTUAL MACHINE" is registered as "DESTINATION VIRTUAL MACHINE", and the CPU3 is registered as "DESTINATION CPU" in the interrupt pending information 221.

In the foregoing description, the generation request notifier 203 notifies merely a request for generating the pseudo task 283, and does not generate the pseudo task 283. The invention is not limited to the above. Alternatively, the generation request notifier 203 may directly generate the pseudo task 283 in the second virtual machine 120. In the modification, the generation request notifier 203 may execute the functions of the pseudo task generator 272 and the virtual interrupt processor 274 provided in the second virtual machine 120.

Generally, the task scheduler 275 in the second virtual machine 120 manages an execution state of a task by a queue called a run queue. The task scheduler 275 connects the tasks which are in an executable state to a run queue, and allocates the right of execution to one of the connected tasks.

As an exemplified method for directly generating the pseudo task 283 in the second virtual machine 120, the generation request notifier 203 may connect the pseudo task 283 which has been generated in advance in the second OS 125 to a run queue to be managed by the task scheduler 275. More specifically, the virtual machine control device 100 is accessible to a memory space of the second virtual machine 120. Accordingly, the generation request notifier 203 in the virtual machine control device 100 may overwrite the memory contents of the run queue in such a manner that the generated pseudo task 283 is connected to the run queue of the second virtual machine 120.

The memory address of a run queue in a memory space may be a memory address which is statically determined in advance. Alternatively, the second virtual machine 120 may notify the virtual machine control device 100 of a predetermined memory address at the time of initialization or start-up of the system, and the notified memory address may be used. Here, the time of initialization of the system may be the time of initialization of the virtual machine system 1000 or the time of initialization of the second OS 125, in addition to the time of initialization of the second virtual machine 120. Further, as a method for specifying the memory address of a run queue, in the case where the memory address of a task to be assigned to a certain CPU is registered in the register of the CPU, the memory address registered in the register may be specified as the memory address of the run queue of the second virtual machine 120.

Next, an example of an operation to be performed by the virtual machine switcher 204 is described.

In response to generation of a request for switching between the virtual machines, the virtual machine switcher 204 allocates the right of execution to one of the virtual machines, based on at least one of the interrupt pending information 221, the schedule policy management information 222, the assignable CPU information 223, and the virtual machine execution state management information 224.

FIG. 5 is a diagram showing an example of a data structure of the assignable CPU information 223. Information as to which one of the CPUs is allocatable to which one of the virtual machines is registered in the assignable CPU information 223. In response to generation of a request for switching of a virtual machine with respect to a certain CPU, the virtual machine switcher 204 recognizes a virtual machine to which the right of execution of the CPU is allocatable, referring to the assignable CPU information 223.

Typically, the assignable CPU information 223 is set at the time of initialization of a system or at the time of start-up of a system. As far as the assignable CPU information 223 is information capable of managing the correlation between the virtual machines and the allocable CPUs, any data format is applicable to the allocable CPU information 223.

In the example shown in FIG. 5, it is clear that although the CPU3 is allocatable to the first virtual machine 110, CPUs other than the CPU3 are not allocatable to the first virtual machine 110. In the example shown in FIG. 5, in response to generation of a request for switching of a virtual machine with respect to the CPU3, the virtual machine switcher 204 designates the first virtual machine 110 and the second virtual machine 120 as objects to which the right of execution is to be assigned. Alternatively, in the example shown in FIG. 5, in response to generation of a request for switching of a virtual machine with respect to a CPU other than the CPU3, the virtual machine switcher 204 designates only the second virtual machine 120 as an object to which the right of execution is to be assigned.

FIG. 6 is a diagram showing an example of a data structure of the schedule policy management information 222. The schedule policy management information 222 is information in which the method for switching the right of execution between the virtual machines is defined. Specifically, the schedule policy management information 222 includes a fixed priority policy 601 indicating that the degree of priority is fixed in allocating the right of execution between the first and second virtual machines 110 and 120, and a time-sharing policy 602 indicating that the right of execution between the first and second virtual machines 110 and 120 is assigned in a time-sharing manner. Alternatively, the schedule policy management information 222 may include a time-sharing policy indicating that the degree of priority is dynamically changed in switching the right of execution, as the time-sharing policy 602.

The virtual machine switcher 204 determines to which one of the virtual machines, the right of execution is assigned in accordance with the degree of priority defined in the fixed priority policy 601 or in the time-sharing policy 602. For instance, in the case where the fixed priority 601 is applied as a method for switching the right of execution, assuming that a large value of priority indicates a high degree of priority, the virtual machine switcher 204 preferentially allocates the right of execution to the first virtual machine 110 rather than the second virtual machine 120.

On the other hand, in the case where the time-sharing policy 602 is applied as a method for switching the right of execution, the degrees of priority of the first and second virtual machines 110 and 120 are set to be the same as each other in the time-sharing policy 602. Accordingly, the virtual machine switcher 204 alternately allocates a slice of time (also called as "a quantum of time") to the first and second virtual machines 110 and 120, regardless of the degrees of priority. In the case where one of the virtual machines has used up an assigned slice of time, the right of execution is switched to the other of the virtual machines.

A request for switching the right of execution to the virtual machine switcher 204 is generated in response to various events. An example of the events is a case, wherein the first virtual machine 110 is brought to an idle state resulting from execution of the idle task 263, and the idle transition notifier 264 notifies the virtual machine switcher 204 of the fact.

The events also include a case, wherein the second virtual machine 120 is brought to an idle state with respect to a certain CPU as a result of execution of the idle task 284 on the CPU, and the idle transition notifier 286 notifies the virtual machine switcher 204 of the fact. The events also include a case, wherein a certain virtual machine has used up an assigned slice of time, in the case where the time-sharing policy 602 is applied as a method for switching the right of execution. The events also include a case, wherein an interrupt has occurred to a virtual machine whose degree of priority is set higher than the degree of priority of the virtual machine which is currently executing a process, in the case where the fixed priority policy 601 is applied as a method for switching the right of execution.

In response to one of the events, the virtual machine switcher 204 switches the right of execution to a virtual machine whose degree of priority is set high, or to a virtual machine which has not yet used up an assigned slice of time, or to a virtual machine which is not in an idle state.

The virtual machine switcher 204 is notified of the CPU identification information of a CPU, of which the right of execution is to be switched by the running CPU determiner 201 or by the interrupt determiner 205. In the case where the virtual machine switcher 204 switches the right of execution of a certain CPU between the virtual machines, the virtual machine switcher 204 switches the right of execution of the CPU after updating the information relating to the CPU in the virtual machine execution state management information 224 into information after the switching.

In response to receiving a notification of an interrupt from e.g. the interrupt controller 55, the interrupt determiner 205 determines the contents of the interrupt. Here, examples of the contents of an interrupt include information relating to a virtual machine as an object to be interrupted and information relating to a CPU as an object to be interrupted. Here, each of the virtual machines notifies the virtual machine control device 100 of the type of a required interrupt in advance. Alternatively, the virtual machine control device 100 may determine in advance the type of an interrupt required in each of the virtual machines. Then, the interrupt determiner 205 manages the interrupt number and the contents of the interrupt in association with each other. Accordingly, in response to designation of the interrupt number from the interrupt controller 55 and receiving a notification of an interrupt, the interrupt determiner 205 is allowed to determine the virtual machine and the CPU as the objects to be interrupted, from the notified interrupt number.

For instance, in the case where the time-sharing policy 602 is applied as a method for switching the right of execution, let it be assumed that a certain virtual machine has used up an assigned slice of time with respect to a certain CPU, and as a result, the virtual machine has timed out. In this case, the interrupt controller 55 notifies the interrupt determiner 205 of a timer interrupt. Then, the interrupt determiner 205 notifies the virtual machine switcher 204 of the interrupt number of the timer interrupt which has been registered in performing a time-shared scheduling, and notifies the virtual machine switcher 204 that the timer interrupt has occurred in the CPU, with use of an interrupt handler for timer processing, which is registered in advance.

Further, in the case where an interrupt has occurred, the interrupt determiner 205 notifies the virtual machine switcher 204 of the interrupt number, the destination virtual machine to which the interrupt is to be delivered, the destination CPU to which the interrupt is to be delivered, and information necessary for processing the interrupt. Here, in the case where the virtual machine switcher 204 determines that an interrupt should not be immediately delivered, the interrupt determiner 205 registers, in the interrupt pending information 221, the interrupt number of the generated interrupt, the destination virtual machine, and the destination CPU.

Next, an example of an operation to be performed by the pseudo task finishing requester 206 is described.

The pseudo task finishing requester 206 is operated in executing a flowchart (see FIG. 8 to be described later) for switching the right of execution from the first virtual machine 110 to the second virtual machine 120 by the virtual machine switcher 204, as a result of bringing the first virtual machine 110 to an idle state. In response to receiving a demand for finishing the pseudo task 283 from the virtual machine switcher 204, and the CPU identification information from the running CPU determiner 201, the pseudo task finishing requester 206 generates a request for finishing the pseudo task 283, and notifies the second OS 125 of the request for finishing the pseudo task 283.

The pseudo task finishing requester 206 converts the finishing demand and the CPU identification information that have been notified from the running CPU determiner 201 and from the virtual machine switcher 204 into a format recognizable by the second OS 125, and notifies the second OS 125 of a request for finishing the pseudo task 283.

Here, as a method for notifying a finishing request, there is proposed a method for delivering, to the second OS 125, a virtual interrupt for finishing the pseudo task 283. For instance, the interrupt number for a virtual interrupt indicating a request for finishing the pseudo task 283 may be determined in advance, and the pseudo task finishing requester 206 may register, in the interrupt pending information 221 shown in FIG. 4, the interrupt number, and the CPU identification information of the CPU on which the pseudo task 283 is finished.

Next, an operation to be performed by the pseudo task finishing requester 206 is described concretely with use of the interrupt pending information 221 shown in FIG. 4.

For instance, let it be assumed that the interrupt number of a virtual interrupt indicating a request for finishing the pseudo task 283 is IRQ7, and the CPU information acquired by the pseudo task finishing requester 206 is the CPU3. In this case, as exemplified by a record 402 shown in FIG. 4, "IRQ7" is registered as "INTERRUPT NUMBER OF GENERATED INTERRUPT", "SECOND VIRTUAL MACHINE" is registered as "DESTINATION VIRTUAL MACHINE", and "CPU3" which is the CPU identification information of the CPU3 is registered as "DESTINATION CPU" in the interrupt pending information 221.

In the foregoing description, the pseudo task finishing requester 206 notifies merely a request for finishing the pseudo task 283, and does not directly finish the pseudo task 283. The invention is not limited to the above. Alternatively, the pseudo task finishing requester 206 may directly finish the pseudo task 283 in the second virtual machine 120. In the modification, the pseudo task finishing requester 206 may execute the functions of the pseudo task finisher 273 and the virtual interrupt processor 274 provided in the second virtual machine 120.

As an exemplified method for directly finishing the pseudo task 283 in the second virtual machine 120, the pseudo task finishing requester 206 may retrieve a target pseudo task 283 from a run queue to be managed by the task scheduler 275, and may remove the searched pseudo task 283 from the run queue. More specifically, the virtual machine control device 100 is accessible to the memory space of the second virtual machine 120. Therefore, the pseudo task finishing requester 206 provided in the virtual machine control device 100 may overwrite the memory contents of a run queue in such a manner that the searched pseudo task 283 is removed from the run queue of the second virtual machine 120.

The memory address of a run queue in a memory space may be a memory address which is statically determined in advance. Alternatively, the second virtual machine 120 may notify the virtual machine control device 100 of a predetermined memory address at the time of initialization or start-up of a system, and the notified memory address may be used. Here, the time of initialization of a system may be the time of initialization of the virtual machine system 1000 or the time of initialization of the second OS 125, in addition to the time of initialization of the second virtual machine 120. Further, as a method for specifying the memory address of a run queue, in the case where the memory address of a task to be assigned to a certain CPU is registered in the register of the CPU, the memory address registered in the register may be specified as the memory address of the run queue of the second virtual machine 120.

Alternatively, upon reaching a timing of switching the right of execution to the second virtual machine 120, the pseudo task finishing requester 206 may notify the second OS 125 of a request for finishing the pseudo task 283. In the above case, in response to generation of a request for finishing the pseudo task 283, the pseudo task finishing requester 206 may register, in the interrupt pending information 221, the finishing request as a virtual interrupt.

In the above case, in response to generation of a request for generating the pseudo task 283, the generation request notifier 203 may register, in the interrupt pending information 221, the generation request as a virtual request, and may notify the second OS 125 of a request for finishing the pseudo task 283 as a virtual interrupt in switching the right of execution from the first virtual machine 110 to the second virtual machine 120.

Then, in the case where a request for generating the pseudo task 283 is registered in the interrupt pending information 221 as a virtual interrupt in notifying a request for finishing the pseudo task 283, the pseudo task finishing requester 206 may delete the virtual interrupt to thereby cancel out the generation request and the finishing request.

In the above configuration, it is possible to prevent a likelihood that the pseudo task 283 may be generated immediately after finishing of the pseudo task 283. This is advantageous in reducing the processing overhead.

The invention is not limited to the above. Alternatively, the pseudo task finishing requester 206 may notify the second OS 125 of a request for finishing the pseudo task 283 immediately after generation of the pseudo task 283.

FIG. 7 is a flowchart showing an operation to be performed by the virtual machine control device 100 according to the embodiment in generating a request for generating the pseudo task 283. Firstly, the virtual machine switcher 204 is notified of a request for switching the right of execution from the second virtual machine 120 to the first virtual machine 110 in response to one of the events (Step S701). This means that a new task to be processed would have been generated in the first virtual machine 110.

Then, the running CPU determiner 201 specifies a CPU, from among the CPUs, of which the right of execution is assigned to the first virtual machine 110 (Step S702). Then, the running CPU determiner 201 notifies the CPU identification information of the specified CPU to the virtual machine switcher 204, the generation determiner 202, the generation request notifier 203, and the pseudo task finishing requester 206. By performing the above operation, the virtual machine switcher 204, the generation determiner 202, the generation request notifier 203, and the pseudo task finishing requester 206 are allowed to specify the CPU of which the right of execution is switched.

Then, the generation determiner 202 checks whether the first virtual machine 110 is in an idle state with respect to the specified CPU, referring to the virtual machine execution state management information 224 shown in FIG. 3 (Step S703). In the example shown in FIG. 3, let it be assumed that the running CPU determiner 201 has specified the CPU 3 as the CPU of which the right of execution is to be switched. In this case, the generation determiner 202 determines that the first virtual machine 110 is in an idle state with respect to the CPU3.

Here, in the case where the first virtual machine 110 is in an idle state with respect to the CPU of which the right of execution is switched, the generation determiner 202 is allowed to determine that the first virtual machine 110 has transited from a state that there is no process to be executed with respect to the CPU to a state that a certain process to be executed with respect to the CPU has been generated. Accordingly, in the case where the first virtual machine 110 is in an idle state with respect to the CPU (YES in Step S704), the generation determiner 202 determines that it is necessary to generate the pseudo task 283, and notifies the generation request notifier 203 of a demand for generating the pseudo task 283. Then, the generation request notifier 203 generates, in the second virtual machine 120, a request for generating the pseudo task 283 to be assigned to the CPU (Step S705).

Here, in the case where it is configured that a generation request and a finishing request are notified to the second OS 125 after the right of execution is switched from the first virtual machine 110 to the second virtual machine 120, the generation request notifier 203 may register a generation request in the virtual interrupt pending information 221 without notifying the second OS 125 of a request for generating the pseudo task 283.

On the other hand, in the case where it is configured that a generation request is notified to the second OS 125 without waiting for switching of the right of execution from the first virtual machine 110 to the second virtual machine 120, the generation request notifier 203 may immediately notify the second OS 125 of a generation request.

In the case where the first virtual machine 110 is not in an idle state with respect to the CPU of which the right of execution is switched (NO in Step S704), the generation determiner 202 determines that it is not necessary to generate the pseudo task 283, and proceeds the process to Step S706. In other words, in the case where the first virtual machine 110 is not in an idle state with respect to a CPU of which the right of execution is switched, it is assumed that the first virtual machine 110 has been executing a certain task with use of the CPU, and the pseudo task 283 corresponding to the certain task has already been generated. Accordingly, in this case, the generation determiner 202 is inoperative to determine that it is necessary to generate the pseudo task 283.

Then, the virtual machine switcher 204 updates the information relating to the CPU of which the right of execution is switched in the virtual machine execution state management information 224 (Step S706). Specifically, the virtual machine switcher 204 changes "VIRTUAL MACHINE TO WHICH RIGHT OF EXECUTION IS ASSIGNED" to "FIRST VIRTUAL MACHINE", changes "EXECUTION STATE OF FIRST VIRTUAL MACHINE" to "TASK EXISTING STATE", and changes, as necessary. "EXECUTION STATE OF SECOND VIRTUAL MACHINE" to "PSEUDO TASK EXISTING STATE" in the virtual machine execution state management information 224 with respect to a CPU of which the right of execution is switched.

Then, the virtual machine switcher 204 switches the right of execution of the CPU from the second virtual machine 120 to the first virtual machine 110 (Step S707).

In this way, in the case where the execution state of the first virtual machine 110 with respect to a CPU of which the right of execution is switched is an idle state in switching the right of execution from the second virtual machine 120 to the first virtual machine 110, the generation determiner 202 determines that the pseudo task 283 should be generated. Then, the generation request notifier 203 notifies the second OS 125 of a generation request.

FIG. 8 is a flowchart showing an operation to be performed by the virtual machine control device 100 according to the embodiment in generating a request for finishing the pseudo task 283. Firstly, the first virtual machine 110 executes an idle task on the CPU3, and transits to an idle state (Step S801). This means that a task that had been executed in the first virtual machine 110 has gone, and there is no task to be processed in the first virtual machine 110.

Then, the idle transition notifier 264 notifies the virtual machine switcher 204 that the first virtual machine 110 has transited from a busy state to an idle state (Step S802). Then, the running CPU determiner 201 specifies a CPU on which an idle task has been executed in the first virtual machine 110 (Step S803). Then, the running CPU determiner 201 notifies the virtual machine switcher 204 and the generation request notifier 203 of the CPU identification information of the specified CPU. By performing the above operation, the virtual machine switcher 204 and the generation request notifier 203 are allowed to specify a CPU of which the right of execution is to be switched.

Then, the pseudo task finishing requester 206 generates a request for finishing the pseudo task 283 (Step S804). Here, in the case where it is configured that a generation request and a finishing request are notified to the second OS 125 after the right of execution is switched from the first virtual machine 110 to the second virtual machine 120, the generation request notifier 203 may register a finishing request in the interrupt pending information 221, without notifying the second OS 125 of a request for finishing the generated pseudo task 283.

On the other hand, in the case where it is configured that a generation request and a finishing request are notified to the second OS 125 without waiting for switching of the right of execution from the first virtual machine 110 to the second virtual machine 120, the generation request notifier 203 may immediately notify the second OS 125 of a generation request.

Then, the virtual machine switcher 204 updates the information relating to the CPU of which the right of execution is switched in the virtual machine execution state management information 224 (Step S805). Specifically, the virtual machine switcher 204 changes "VIRTUAL MACHINE TO WHICH RIGHT OF EXECUTION IS ASSIGNED" to "SECOND VIRTUAL MACHINE", changes "EXECUTION STATE OF FIRST VIRTUAL MACHINE" to "IDLE STATE", and changes, as necessary, "EXECUTION STATE OF SECOND VIRTUAL MACHINE" to "IDLE STATE" or "TASK EXISTING STATE" in the virtual machine execution state management information 224 with respect to a CPU of which the right of execution is switched.

Then, the virtual machine switcher 204 allocates the right of execution of the CPU to the second virtual machine 120 (Step S806).

FIG. 9 is a flowchart showing an operation to be performed by the virtual machine control device 100 according to the embodiment in notifying the second OS 125 of a request for generating the pseudo task 283 and a request for finishing the pseudo task 283. The flowchart shown in FIG. 9 is a flowchart to be applied in the case where it is configured that a generation request and a finishing request are notified to the second OS 125 after the right of execution is switched from the first virtual machine 110 to the second virtual machine 120.

Firstly, a request for switching the right of execution from the first virtual machine 110 to the second virtual machine 120 is notified to the virtual machine switcher 204 in response to a certain event. Then, the virtual machine switcher 204 switches the right of execution of a certain CPU from the first virtual machine 110 to the second virtual machine 120 (Step S901).

Here, the virtual machine switcher 204 may determine the second virtual machine 120 as a destination virtual machine, based on the information relating to an interrupt to be acquired from the interrupt determiner 205 or based on the information relating to an interrupt to be recorded in the interrupt pending information 221 in switching between the virtual machines.

Then, the virtual interrupt processor 274 in the second OS 125 receives a virtual interrupt indicating a request for generating the pseudo task 283 to be notified from the generation request notifier 203, or a virtual interrupt indicating a request for finishing the pseudo task 283 to be notified from the pseudo task finishing requester 206 (Step S902).

Then, the virtual interrupt processor 274 determines whether the received virtual interrupt is a virtual interrupt indicating a request for generating the pseudo task 283, or a virtual interrupt indicating a request for finishing the pseudo task 283 (Step S903).

Then, in the case where the received virtual interrupt is a virtual interrupt indicating a request for generating the pseudo task 283 (GENERATION REQUEST in Step S903), the virtual interrupt processor 274 receives, from the generation request notifier 203, the CPU identification information of the CPU to which the pseudo task 283 is assigned, and notifies the pseudo task generator 272 of the fact that a virtual interrupt indicating a request for generating the pseudo task 283 has occurred and of the CPU identification information. Then, the pseudo task generator 272 generates the pseudo task 283 to be assigned to the CPU designated by the CPU identification information (Step S904).

On the other hand, in the case where the received virtual interrupt is a virtual interrupt indicating a request for finishing the pseudo task 283 (FINISHING REQUEST in Step S903), the virtual interrupt processor 274 receives, from the pseudo task finishing requester 206, the CPU identification information of the CPU to which the pseudo task 283 is assigned. Then, the virtual interrupt processor 274 notifies the pseudo task finisher 273 of the fact that a virtual interrupt has occurred and of the CPU identification information. Then, the pseudo task finisher 273 finishes the pseudo task 283 assigned to the CPU designated by the CPU identification information (Step S905).

FIG. 10 is a flowchart showing an operation to be performed in generating a request for generating the pseudo task 283 in response to transition of the second virtual machine 120 from a busy state to an idle state.

Firstly, the second virtual machine 120 executes the idle task 284 on a certain CPU, and transits from a busy state to an idle state with respect to the CPU (Step S1001). This means that a task that had been executed on the CPU in the second virtual machine 120 has gone, and there is no task to be processed by the second virtual machine 120.

Then, the idle transition notifier 286 notifies the virtual machine switcher 204 that the second virtual machine 120 has transited from a busy state to an idle state (Step S1002). Then, the running CPU determiner 201 specifies a CPU on which an idle task has been executed in the second virtual machine 110 (Step S1003). Then, the running CPU determiner 201 notifies the virtual machine switcher 204 and the generation request notifier 203 of the CPU identification information of the specified CPU. By performing the above operation, the virtual machine switcher 204 and the generation request notifier 203 are allowed to specify a CPU of which the right of execution is switched.

In the virtual machine control device 100 according to the embodiment, in the case where the first virtual machine 110 is executing a task other than the idle task 263 on a certain CPU, the second virtual machine 120 preferentially executes, on the CPU, the pseudo task 283 rather than the idle task 284. Accordingly, in the case where the second virtual machine 120 executes the idle task 284 on a certain CPU, the first virtual machine 110 executes an idle task on the CPU.

Therefore, in the case where a request for switching a virtual machine is generated in response to transition of the second virtual machine 120 from a busy state to an idle state with respect to a certain CPU, the generation determiner 202 does not have to check whether the first virtual machine 110 is in an idle state with respect to the CPU, because it is clear that the first virtual machine 110 is in an idle state with respect to the CPU.

Then, the generation determiner 202 checks whether a virtual interrupt to the first virtual machine 110 and with respect to the CPU is registered in the interrupt pending information 221, referring to the interrupt pending information 221 (Step S1004). Then, in the case where a virtual interrupt to the first virtual machine 110 is registered with respect to the CPU of which the right of execution is switched, the generation determiner 202 determines that the first virtual machine 110 has transited from a state that there is no process to be executed with respect to the CPU to a state that a certain process to be executed with respect to the CPU has been generated.

Then, in the case where a virtual interrupt to the first virtual machine 110 is registered in the interrupt pending information 221 with respect to the CPU (YES in Step S1005), the generation determiner 202 determines that it is necessary to generate the pseudo task 283, and notifies the generation request notifier 203 of a demand for generating the pseudo task 283. Then, the generation request notifier 203 generates a request for generating the pseudo task 283 (Step S1006).

Here, in the case where it is configured that a generation request and a finishing request are notified to the second OS 125 after the right of execution is switched from the first virtual machine 110 to the second virtual machine 120, the generation request notifier 203 may register a request for finishing the generated pseudo task 283 in the interrupt pending information 221.

On the other hand, in the case where it is configured that a generation request and a finishing request are notified to the second OS 125 without waiting for switching of the right of execution from the first virtual machine 110 to the second virtual machine 120, the generation request notifier 203 may immediately notify the second OS 125 of a generation request.

Then, the virtual machine switcher 204 updates the information relating to the CPU in the virtual machine execution state management information 224 (Step S1007). Specifically, the virtual machine switcher 204 changes "VIRTUAL MACHINE TO WHICH RIGHT OF EXECUTION IS ASSIGNED" to "FIRST VIRTUAL MACHINE", changes "EXECUTION STATE OF FIRST VIRTUAL MACHINE" to "TASK EXISTING STATE", and changes "EXECUTION STATE OF SECOND VIRTUAL MACHINE" to "PSEUDO TASK EXISTING STATE" in the virtual machine execution state management information 224 with respect to the CPU of which the right of execution is switched. Then, the virtual machine switcher 204 switches the right of execution of the CPU to the first virtual machine 110 (Step S1007).

On the other hand, in the case where a virtual interrupt to the first virtual machine 110 is not registered in the interrupt pending information 221 with respect to the CPU (NO in Step S1005), the virtual machine switcher 204 updates the information relating to the CPU in the virtual machine execution state management information 224 (Step S1008). Specifically, the virtual machine switcher 204 changes "VIRTUAL MACHINE TO WHICH RIGHT OF EXECUTION IS ASSIGNED" to "SECOND VIRTUAL MACHINE", and changes "EXECUTION STATE OF SECOND VIRTUAL MACHINE" to "IDLE STATE" in the virtual machine execution state management information 224 with respect to the CPU. Then, the virtual machine switcher 204 switches the right of execution of the CPU to the second virtual machine 120 (Step S1008).

In Step S1008, the virtual machine switcher 204 switches the right of execution to the second virtual machine 120. However, no inconvenience is involved even if the right of execution is switched to the first virtual machine 110.

In this way, in the case where there is a standby task to be processed in the first virtual machine 110 with respect to a certain processor, in transiting the second virtual machine 120 from a task execution state to an idle state with respect to the processor, the generation determiner 202 determines that the pseudo task 283 should be generated. Then, the generation request notifier 203 generates a request for generating the pseudo task 283.

FIG. 11 is a flowchart showing a process to be performed when the second virtual machine 120 has used up an assigned slice of time, in the case where the time-sharing policy 602 of allocating the right of execution between the first and second virtual machines 110 and 120 in a time-sharing manner is applied.

Firstly, the interrupt determiner 205 receives a timer interrupt from the interrupt controller 55 (Step S1101). Then, the interrupt determiner 205 determines whether a virtual machine has used up an assigned slice of time on one of the CPUs, and as a result, a timer interrupt has occurred (Step S1002).

Then, the virtual machine switcher 204 confirms that the second virtual machine 120 is the virtual machine to which the right of execution of the CPU is assigned, referring to the virtual machine execution state management information 224 (Step S1103).

Then, the generation determiner 202 checks whether the first virtual machine 110 is in an idle state with respect to the CPU, referring to the virtual machine execution state management information 224 (Step S1104).

In the case where the first virtual machine is not in an idle state with respect to the CPU (NO in Step S1105), it is assumed that a certain task had been executed on the CPU and the pseudo task 283 corresponding to the task has already been generated in the first virtual machine 110. Accordingly, in the case where the determination result in Step S1105 is negative, the generation determiner 202 proceeds the process to Step S1110 without generating a request for generating the pseudo task 283. Then, the virtual machine switcher 204 updates the information relating to the CPU in the virtual machine execution state management information 224, and switches the right of execution of the CPU to the first virtual machine 110 (Step S1110).

On the other hand, in the case where the first virtual machine 110 is in an idle state with respect to the CPU (YES in Step S1105), the generation determiner 202 checks whether a virtual interrupt to the first virtual machine 110 and with respect to the CPU has occurred, referring to the interrupt pending information 221 (Step S1106).

Then, in the case where there exists a virtual interrupt to the first virtual machine 110 and with respect to the CPU (YES in Step S1107), the generation determiner 202 determines that the pseudo task 283 should be generated, and notifies the generation request notifier 203 of a demand for generating the pseudo task 283. Then, the generation request notifier 203 generates a request for generating the pseudo task 283 (Step S1108). Then, the virtual machine switcher 204 updates the information relating to the CPU in the virtual machine execution state management information 224, and switches the right of execution of the CPU to the first virtual machine 110 (Step S1109). Specifically, the virtual machine switcher 204 changes "VIRTUAL MACHINE TO WHICH RIGHT OF EXECUTION IS ASSIGNED" to "FIRST VIRTUAL MACHINE", changes "EXECUTION STATE OF FIRST VIRTUAL MACHINE" to "TASK EXISTING STATE", and changes, as necessary, "EXECUTION STATE OF SECOND VIRTUAL MACHINE" to "TASK EXISTING STATE" or "IDLE STATE" in the virtual machine execution state management information 224 with respect to the CPU of which the right of execution is switched.

On the other hand, in the case where there does not exist a virtual interrupt to the first virtual machine 110 and with respect to the CPU (NO in Step S1007), the virtual machine switcher 204 updates the information relating to the CPU in the virtual machine execution state management information 224, and switches the right of execution of the CPU to the second virtual machine 120 (Step S1111). In Step S1111, the virtual machine switcher 204 switches the right of execution of the CPU to the second virtual machine 120. Alternatively, the right of exertion may be switched to the first virtual machine 110.

As described above, in the case where the right of execution of a certain CPU is assigned to the first and second virtual machines 110 and 120 in a time-sharing manner, the generation determiner 202 determines that the pseudo task 283 should be generated, in the case where the execution state of the first virtual machine 110 is an idle state with respect to the CPU and there exists a standby task to be processed by the first virtual machine 110 when the second virtual machine 120 has used up an assigned slice of time.

FIG. 12 is a flowchart showing a process to be performed when an interrupt to the first virtual machine 110 has occurred during execution of a task by the second virtual machine 120, in the case where it is configured to determine the right of execution between the first and second virtual machines 110 and 120 with use of the fixed priority policy 601. In the following description, let it be assumed that the degree of priority of the first virtual machine 110 is set higher than the degree of priority of the second virtual machine 120.

Firstly, the interrupt determiner 205 receives an interrupt from the interrupt controller 55 (Step S1201). Then, the interrupt determiner 205 confirms that the received interrupt is an interrupt to the first virtual machine 110. Further, the interrupt determiner 205 determines with which one of the CPUs, the received interrupt is associated (Step S1202).

Then, the virtual machine switcher 204 refers to the fixed priority policy 601 for determining whether the right of execution by the virtual machine is to be switched (Step S1203). Here, the virtual machine switcher 204 determines that the degree of priority of the first virtual machine 110 is higher than the degree of priority of the second virtual machine 120. Accordingly, the virtual machine switcher 204 delivers an interrupt that has occurred to the first virtual machine 110, and determines that the right of execution should be switched to the first virtual machine 110.

If the execution state of the second virtual machine 120 is a task-existing state in the case where the degree of priority of the first virtual machine 110 is set higher than the degree of priority of the second virtual machine 120, the first virtual machine 110 is in an idle state with respect to the CPU. Accordingly, in the case where an interrupt to the first virtual machine 110 is generated, the virtual machine switcher 204 is allowed to determine that there has been generated a new task to be processed in the first virtual machine 110.

Then, the generation request notifier 203 determines that it is necessary to generate the pseudo task 283 with respect to the CPU, and notifies the generation request notifier 203 of a demand for generating the pseudo task 283. Then, the generation request notifier 203 generates a request for generating the pseudo task 283 (Step S1204).

Here, in the case where it is configured that a generation request and a finishing request are notified to the second OS 125 after the right of execution is switched from the first virtual machine 110 to the second virtual machine 120, the generation request notifier 203 may register a finishing request in the interrupt pending information 221 without notifying the second OS 125 of a request for finishing the generated pseudo task 283.

On the other hand, in the case where it is configured that a generation request and a finishing request are notified to the second OS 125 without waiting for switching the right of execution from the first virtual machine 110 to the second virtual machine 120, the generation request notifier 203 may immediately notify the second OS 125 of a generation request.

Then, the virtual machine switcher 204 updates the information relating to the CPU in the virtual machine execution state management information 224, and switches the right of execution of the CPU to the first virtual machine 110 (Step S1205). Specifically, the virtual machine switcher 204 changes "VIRTUAL MACHINE TO WHICH RIGHT OF EXECUTION IS ASSIGNED" to "FIRST VIRTUAL MACHINE", changes "EXECUTION STATE OF FIRST VIRTUAL MACHINE" to "TASK EXISTING STATE", and changes "EXECUTION STATE OF SECOND VIRTUAL MACHINE" to "PSEUDO TASK EXISTING STATE" in the virtual machine execution state management information 224 with respect to the CPU of which the right of execution is switched.

As described above, in the case where the right of execution by the first virtual machine 110 is set higher than the right of execution by the second virtual machine 120, the generation determiner 202 determines that the pseudo task 283 should be generated, in the case where an interrupt to the first virtual machine 110 has occurred with respect to a certain CPU when a certain task is being executed on the CPU in the second virtual machine 120.

In the above configuration, the inventive virtual machine control device 100 is operable to bring a CPU to an electric power saving state at an appropriate timing, utilizing the electric power saving function of an operating system, without providing an electric power saving function in the virtual machine control device 100. Thus, it is possible to implement electric power saving control of the entirety of the virtual machine system 1000.

In the following, the electric power saving control of the entirety of the system to be implemented by the inventive virtual machine control device is described.

Figure 13:
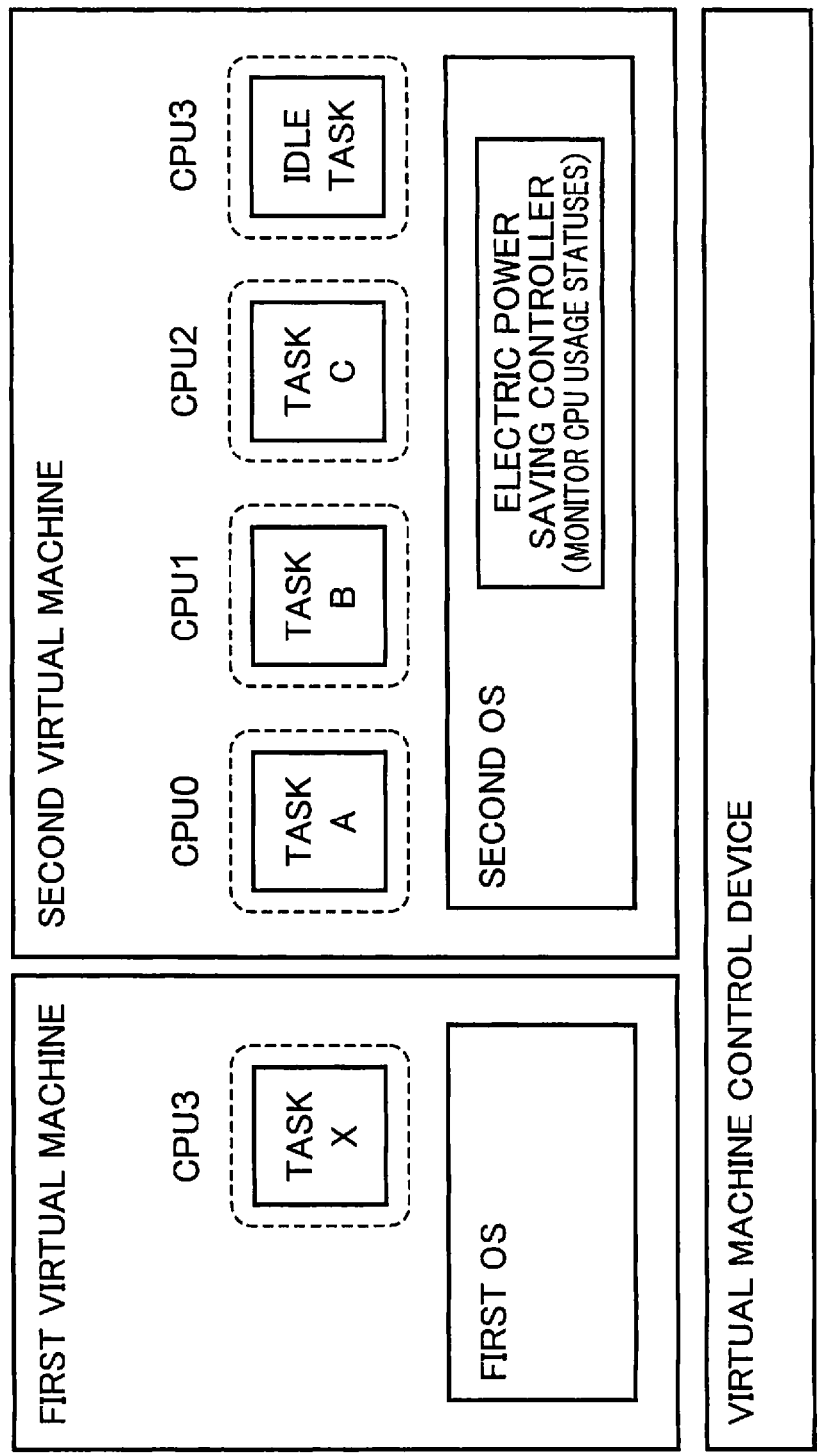
FIG. 13 is a diagram showing an example of task execution states in virtual machines of a virtual machine system, as a comparative example with respect to the embodiment.

FIG. 13 is a diagram showing an example of execution states of tasks in virtual machines of a virtual machine system as a comparative example of the embodiment. In the second virtual machine, a task A is executed on a CPU0, a task B is executed on a CPU1, a task C is executed on a CPU2; and an idle task is executed on a CPU3. On the other hand, in the first virtual machine, a task X is assigned to the CPU3, and executed on the CPU3.

An electric power saving controller of a second OS checks the operation statuses of the CPUs, statistically samples that a certain one of the CPUs is in an idle state, and stops supply of electric power to the CPU or lowers the clock frequency to be supplied to the CPU based on a sampling result. For instance, let it be assumed that in the second virtual machine, the electric power saving controller of the second OS has operated on the CPUs other than the CPU3, and checked the operation statuses of all the CPUs. In this case, the electric power saving controller may misjudge that the CPU3 is in an idle state, because the electric power saving controller is only allowed to know the region managed by the second OS. Actually, however, the first virtual machine is executing the task X on the CPU3. Accordingly, the electric power saving controller of the second OS may misjudge that the CPU3 is in an idle state and may misjudge the usage statuses of the CPUs of the entirety of the virtual machine system, regardless that the task X is operated on the CPU3 in the first virtual machine.

Figure 14:
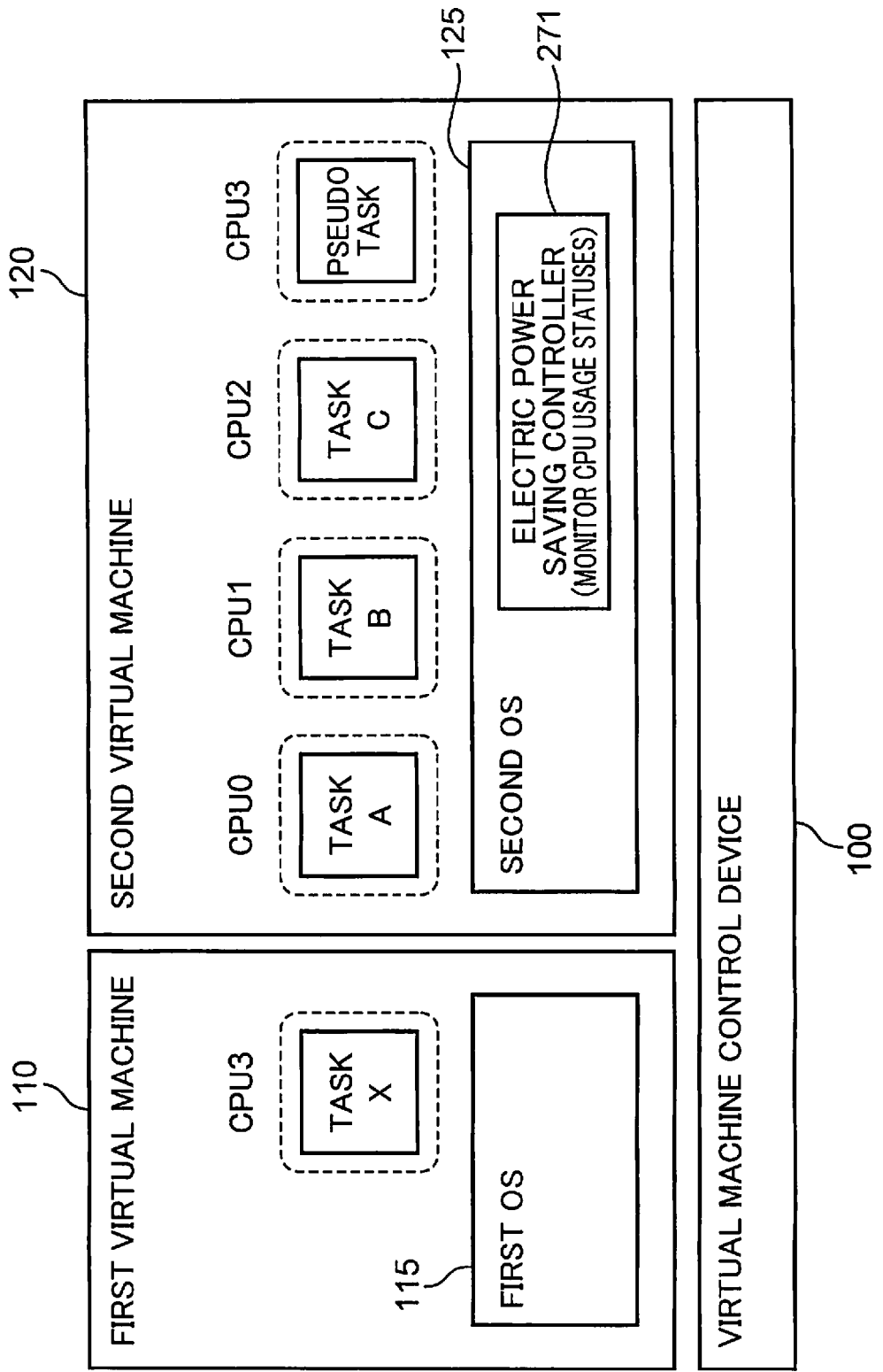
FIG. 14 is a diagram showing an example of task execution states in virtual machines of the virtual machine control device according to the embodiment.

FIG. 14 and FIG. 15 are diagrams showing an example of execution states of tasks in virtual machines to be controlled by the virtual machine control device 100 according to the embodiment. In the example shown in FIG. 14, in response to allocation of a task X to a CPU3 in the first virtual machine 110, a pseudo task is assigned to the CPU3 in the second virtual machine 120.

In the case where the execution state of the CPU3 is brought to a task-existing state, and a task is executed in the first virtual machine 110, a pseudo task is executed in the second virtual machine 120 without fail before the execution state of the CPU3 is changed to an idle state in the second virtual machine 120.

In the case where the electric power saving controller 271 has checked the operation statuses of all the CPUs, the electric power saving controller 271 determines that the CPU3 is not in an idle state and that a pseudo task is executed on the CPU3. Accordingly, the electric power saving controller 271 determines that the execution state of the CPU is a task-existing state. Thus, there is no likelihood that the CPU3 is brought to an electric power saving state by the electric power saving controller 271.

In the example shown in FIG. 15, the second virtual machine 120 is executing an idle task on the CPU3, and the CPU3 is in an idle state. Accordingly, a pseudo task that has been assigned to the CPU3 in the second virtual machine 120 is finished.

If there is no task to be assigned to the CPU3 in the second virtual machine 120 in the above condition, the CPU3 is brought to an idle state in the second virtual machine 120, as well as in the first virtual machine 110. Accordingly, the electric power saving controller 271 determines that the CPU3 is in an idle state in the second virtual machine 120. This determination is substantially equivalent to a determination that the CPU3 is in an idle state with respect to the entirety of the virtual machine system 1000 including the first virtual machine 110. Therefore, no inconvenience is involved even if the electric power saving controller 271 brings the CPU3 to an electric power saving state.

To simplify the description, the embodiment of the invention has been described with use of two virtual machines i.e. the first virtual machine 110 and the second virtual machine 120. Alternatively, the number of virtual machines corresponding to the first virtual machine 110 may be two or more. Further, in the case where there exists a third virtual machine other than the first and second virtual machines 110 and 120, the virtual machine control device 100 may generate a pseudo task corresponding to the third virtual machine in the second virtual machine 120 substantially in the same manner as in the first virtual machine 110. In the above modification, the electric power saving controller 271 in the second virtual machine 120 is operable to appropriately bring a corresponding CPU to an electric power saving state.

Each of the functional blocks in FIG. 2, which shows the embodiment of the invention is typically implemented as a program to be processed in cooperation with a processor and an external memory, but may be implemented by an LSI as an integrated circuit. Each of the functional blocks may be individually formed into a one-chip device, or a part or all of the functional blocks may be formed into a one-chip device. In this example, the integrated circuit is an LSI. The integrated circuit may also, be called as an IC, a system LSI, a super LSI or an ultra LSI, depending on the degree of integration.

Further alternatively, the integrated circuit method is not limited to an LSI method. The integrated circuit may be implemented by a dedicated circuit or a general-purpose processor. After fabricating an LSI, an FPGA (Field Programmable Gate Array) capable of programming, or a reconfigurable processor capable of reconfiguring connection or setting of circuit cells within the LSI may also be used.

Further, if an integration circuit technology substantially equivalent to the LSI technology is developed in the future by the progress of semiconductor technology or by another technology derived from the semiconductor technology, it is needless to say that the functional blocks are integrated using such technology.

As far as the invention is directed to an information processing system provided with processor and a memory device, it is needless to say that the invention is also applicable to all the electronic equipments, information equipments, AV equipments, communication equipments and household electrical appliances, for instance, to PCs (personal computers), mobile information terminals such as mobile phones, smartphones and PDAs, televisions, hard disk recorders, various disc recorders using e.g. DVDs and blu-ray discs, various disc players using e.g. DVDs and blu-ray discs, and car navigation systems.

The foregoing description is merely an example of the invention in every aspect, and does not limit the scope of the invention. It is needless to say that various improvements or modifications may be implemented, as far as such improvements or modifications do not depart from the scope of the invention hereinafter defined.

(Summary of Virtual Machine Control Device of Embodiment)

(1) The virtual machine control device of the embodiment is a virtual machine control device for controlling a first virtual machine and a second virtual machine, the first virtual machine and the second virtual machine being configured in such a manner that one or more processors are assigned to the first virtual machine, a first operating system is operative in the first virtual machine, one or more processors are assigned to the second virtual machine, and a second operating system is operative in the second virtual machine. The second operating system is provided with an electric power saving controller which controls supply of electric power to the processors, based on usage statuses of the processors. The virtual machine control device includes a pseudo task generation requester which notifies the second operating system of a request for generating a pseudo task indicating that a certain one of the processors is in a use state, in the case where a task to be processed by the first virtual machine is assigned to the one processor, but a task to be processed by the second virtual machine is not assigned to the one processor.

In the above configuration, in the case where a task to be processed by the first virtual machine is assigned to a certain processor, but a task to be processed by the second virtual machine is not assigned to the processor, the second operating system is notified of a request for generating a pseudo task indicating that the processor is in a use state. By performing the above operation, a pseudo task is generated in the second virtual machine, and the generated pseudo task is assigned to the CPU. As a result of the above operation, the second operating system determines that a task is being executed on the CPU. This is advantageous in keeping the electric power saving controller in the second operating system from bringing the CPU to an electric power saving state, regardless that a task in the first virtual machine is being executed on the CPU. Accordingly, it is possible to appropriately perform electric power saving control of the entirety of a virtual machine system, utilizing the electric power saving controller in the operating system, without providing a complicated electric power saving controller in a virtual machine control device.

(2) Preferably, the pseudo task generation requester may include a generation determiner which determines whether the pseudo task is to be generated, based on a state of the first virtual machine, in switching a right of execution of the processor from the second virtual machine to the first virtual machine, and a generation request notifier which notifies the second operating system of the request for generating the pseudo task, in the case where the generation determiner determines that the pseudo task is to be generated.

In the above configuration, it is determined whether a pseudo task is to be generated in switching the right of execution of a certain processor from the second virtual machine to the first virtual machine. In the case where it is determined that a pseudo task is to be generated, the second operating system is notified of a request for generating a pseudo task. Accordingly, it is possible to determine whether a pseudo task is to be generated at an appropriate timing.

(3) Preferably, in the case where an execution state of the first virtual machine with respect to the processor of which the right of execution is switched is an idle state, in switching the right of execution from the second virtual machine to the first virtual machine, the generation determiner may determine that the pseudo task is to be generated.

In the case where the right of execution of a certain processor is switched from the second virtual machine to the first virtual machine in response to a certain event, and if the first virtual machine is in an idle state, the processor is in a state immediately before the processor processes a task in the first virtual machine. Therefore, in this state, a pseudo task indicating that the processor is in an use state has not yet been generated in the second virtual machine. In view of this, in this configuration, it is determined that a pseudo task is to be generated in the above state.

On the other hand, in the case where the right of execution of a certain processor is switched from the second virtual machine to the first virtual machine in response to a certain event, and if the first virtual machine is not in an idle state with respect to the processor, and a certain task is assigned to the processor, a pseudo task indicating that the processor is in a use state has already been generated in the second virtual machine, and therefore, it is not necessary to generate a pseudo task. In view of this, in this configuration, it is determined that a pseudo task is not to be generated in the above state. Accordingly, this is advantageous in preventing generation of a pseudo task when it is not necessary to do so.

(4) Preferably, in the case where there is a standby task to be processed by the first virtual machine with respect a certain one of the processors when the second virtual machine transits from a task execution state to an idle state with respect to the one processor, the generation determiner may determine that the pseudo task is to be generated.

In the case where the second virtual machine transits from a task execution state to an idle state with respect to a certain processor, and if there is a standby task to be processed by the first virtual machine with respect to the processor, the right of execution of the processor is switched from the first virtual machine to the second virtual machine, and the standby task is processed. In this case, the second virtual machine is in an idle state with respect to the processor, but the first virtual machine is in an task execution state with respect to the processor. In view of this, in this configuration, it is determined that a pseudo task is to be generated in the above state. This is advantageous in keeping the electric power saving controller from bringing a certain processor to an electric power saving state, regardless that a task is assigned to the processor in the first virtual machine.

(5) Preferably, the first virtual machine and the second virtual machine may be assigned with the right of execution of a certain one of the processors in a time-sharing manner, and in the case where an execution state of the first virtual machine is an idle state with respect to the one processor, and there is a standby task to be processed by the first virtual machine with respect to the one processor, when the second virtual machine has used up an assigned slice of time, the generation determiner may determine that the pseudo task is to be generated.

In the case where the execution state of the first virtual machine is an idle state with respect to a certain processor, and there is a standby task to be processed by the first virtual machine when the second virtual machine has used up an assigned slice of time with respect to the processor, the right of execution of the processor is switched to the first virtual machine, and the task is processed by the processor. In this case, the second virtual machine is in an idle state with respect to the processor, but the first virtual machine is in a task execution state with respect to the processor. In this configuration, it is determined that a pseudo task is to be generated in the above state. This is advantageous in keeping the electric power saving controller from bringing a certain processor to an electric power saving state, regardless that a task is assigned to the processor in the first virtual machine.

(6) Preferably, the right of execution by the first virtual machine may be set higher than the right of execution by the second virtual machine, and in the case where an interrupt to the first virtual machine has occurred with respect to a certain one of the processors, when a task is being executed on the one processor by the second virtual machine, the generation determiner may determine that the pseudo task is to be generated.

In the case where the right of execution by the first virtual machine is set higher than the right of execution by the second virtual machine, and if an interrupt to the first virtual machine has occurred with respect to a certain processor when a task is being executed on the processor by the second virtual machine, the right of execution of the processor is switched to the first virtual machine, and the task is processed by the processor. In this case, the second virtual machine is in an idle state with respect to the processor, but the first virtual machine is in a task execution state with respect to the processor. In this configuration, it is determined that a pseudo task is to be generated in the above state. This is advantageous in keeping the electric power saving controller from bringing a certain processor to an electric power saving state, regardless that a task is assigned to the processor in the first virtual machine.

(7) Preferably, the virtual machine control device may further include a pseudo task finishing requester which notifies the second operating system of a request for finishing the pseudo task, in the case where a task in the first virtual machine is finished with respect to the processor to which the pseudo task is assigned.

In the above configuration, the pseudo task is also finished in association with and in response to finishing a task to be processed by a certain processor in the first virtual machine. Accordingly, as far as both of the first virtual machine and the second virtual machine are in an idle state with respect to the processor, the electric power saving controller is operable to bring the processor to an electric power saving state.

(8) Preferably, in the case where there is no task to be processed by the first virtual machine with respect to a certain one of the processors, the first operating system may cause the first virtual machine to execute a first idle task indicating that the first virtual machine is in an idle state with respect to the one processor, and the pseudo task finishing requester may notify the second operating system of the request for finishing the pseudo task in response to execution of the first idle task.

In the above configuration, in response to finishing of a task in the first virtual machine with respect to a certain processor, the first idle task is executed on the processor. Accordingly, the pseudo task finishing requester is allowed to accurately recognize finishing of the task in the first virtual machine by the first idle task. Then, the pseudo task finishing requester notifies the second operating system of a request for finishing the pseudo task. This enables to accurately associate the pseudo task and the task corresponding to the pseudo task in the first virtual machine.

(9) Preferably, in the case where there is no task to be processed by the second virtual machine with respect to a certain one of the processors, the second operating system may cause the second virtual machine to execute a second idle task indicating that the second virtual machine is in an idle state with respect to the one processor, and sets a degree of priority of the pseudo task higher than a degree of priority of the second idle task but lower than a degree of priority of a task other than the pseudo task and the second idle task.

In the above configuration, in the case where there is no task to be processed by a certain processor in the second virtual machine, the second operating system causes the second virtual machine to execute the second idle task on the processor. Here, the degree of priority of the second idle task is set lower than the degree of priority of the pseudo task. Accordingly, in the case where the second virtual machine is executing the second idle task on a certain processor, the electric power saving controller is allowed to determine that the first virtual machine is also in an idle state with respect to the processor, and to accurately bring the processor to an electric power saving state.

(10) Preferably, the pseudo task generation requester may notify the generation request and the pseudo task finishing requester may notify the finishing request in switching the right of execution from the first virtual machine to the second virtual machine.

In the above configuration, the pseudo task generation requester does not immediately notify a request for generating a pseudo task, regardless of a determination that it is necessary to generate a pseudo task, and a notification of a request for generating a pseudo task is held until the right of execution is switched from the first virtual machine to the second virtual machine. Further, as well as the pseudo task generation requester, the pseudo task finishing requester also holds a notification of a request for generating a pseudo task until the right of execution is switched from the first virtual machine to the second virtual machine.

(11) Preferably, in the case where there is an unnotified request for generating the pseudo task in notifying the request for finishing the pseudo task, the pseudo task finishing requester may cancel out the generation request and the finishing request.

In the above configuration, in the case where a request for generating a pseudo task is generated after a request for finishing a pseudo task has been generated and before the finishing request is notified, the generation request and the finishing request are cancelled out. This enables to avoid a likelihood that a pseudo task may be finished immediately after the pseudo task has been generated. Accordingly, it is possible to prevent generation of a pseudo task when it is not necessary to do so. This is advantageous in reducing the processing overhead.

(12) Preferably, in the case where there is an unnotified request for finishing the pseudo task in notifying the request for generating the pseudo task, the pseudo task generation requester may cancel out the finishing request and the generation request.

In the above configuration, in the case where a request for finishing a pseudo task is generated after a request for generating a pseudo task has been generated and before the generation request is notified, the finishing request and the generation request are cancelled out. This enables to avoid a likelihood that a pseudo task may be generated immediately after a pseudo task has been finished. Accordingly, it is possible to prevent finishing of a pseudo task when it is not necessary to do so. This is advantageous in reducing the processing overhead.

INDUSTRIAL APPLICABILITY

The virtual machine control device, the virtual machine control method, the virtual machine control program, and the integrated circuit of the invention are capable of efficiently using the electric power saving function of an operating system to thereby reduce the electric power consumption. Accordingly, the virtual machine control device, the virtual machine control method, the virtual machine control program, and the integrated circuit of the invention are useful as an electric power saving technology for electronic products, in which electric power saving control is required. Further, the virtual machine control device, the virtual machine control method, the virtual machine control program, and the integrated circuit of the invention are also useful in equipments loaded with a computer, such as information equipments. AV equipments, communication equipments, household electrical appliances, and electronic products.

The invention claimed is:
1. A virtual machine control device, configured of one or more processors, for controlling a first virtual machine and a second virtual machine, the first virtual machine and the second virtual machine being configured in such a manner that the one or more processors are assigned to the first virtual machine, a first operating system is operative in the first virtual machine, the one or more processors are assigned to the second virtual machine, and a second operating system is operative in the second virtual machine, the second operating system being provided with an electric power saving controller which controls supply of electric power to the processors, based on usage statuses of the processors, the virtual machine control device comprising:

a pseudo task generation requester which notifies the second operating system of a request for generating a pseudo task which is a task which when operated on one of the processors indicates to the second virtual machine that a task by the first virtual machine is being performed on the one processor, wherein the second operating system includes a pseudo task generator which generates the pseudo task to be assigned to the one processor, when receiving the notification of the request for generating the pseudo task, and the electric power saving controller of the second operating system, in response to the indication by the pseudo task operated on the one processor, prevents the one processor from being brought to an electric power saving state.

2. The virtual machine control device according to claim 1, wherein the pseudo task generation requester includes a generation determiner which determines whether the pseudo task is to be generated, based on a state of the first virtual machine, in switching a right of execution of the processor from the second virtual machine to the first virtual machine, and a generation request notifier which notifies the second operating system of the request for generating the pseudo task, in the case where the generation determiner determines that the pseudo task is to be generated.

3. The virtual machine control device according to claim 2, wherein in the case where an execution state of the first virtual machine with respect to the processor of which the right of execution is switched is an idle state, in switching the right of execution from the second virtual machine to the first virtual machine, the generation determiner determines that the pseudo task is to be generated.

4. The virtual machine control device according to claim 2, wherein in the case where there is a standby task to be processed by the first virtual machine with respect to the one processor when the second virtual machine transits from a task execution state to an idle state with respect to the one processor, the generation determiner determines that the pseudo task is to be generated.

5. The virtual machine control device according to claim 2, wherein the first virtual machine and the second virtual machine are assigned with the right of execution of the one processor in a time-sharing manner, and in the case where an execution state of the first virtual machine is an idle state with respect to the one processor, and there is a standby task to be processed by the first virtual machine with respect to the one processor, when the second virtual machine has used up an assigned slice of time, the generation determiner determines that the pseudo task is to be generated.

6. The virtual machine control device according to claim 2, wherein the right of execution by the first virtual machine is set higher than the right of execution by the second virtual machine, and in the case where an interrupt to the first virtual machine has occurred with respect to the one processor, when a task is being executed on the one processor by the second virtual machine, the generation determiner determines that the pseudo task is to be generated.

7. The virtual machine control device according to claim 1, further comprising:

a pseudo task finishing requester which notifies the second operating system of a request for finishing the pseudo task, in the case where a task in the first virtual machine is finished with respect to the processor to which the pseudo task is assigned.

8. The virtual machine control device according to claim 7, wherein in the case where there is no task to be processed by the first virtual machine with respect to the one processor, the first operating system causes the first virtual machine to execute a first idle task indicating that the first virtual machine is in an idle state with respect to the one processor, and the pseudo task finishing requester notifies the second operating system of the request for finishing the pseudo task in response to execution of the first idle task.

9. The virtual machine control device according to claim 1, wherein in the case where there is no task to be processed by the second virtual machine with respect to the one processor, the second operating system causes the second virtual machine to execute a second idle task indicating that the second virtual machine is in an idle state with respect to the one processor, and sets a degree of priority of the pseudo task higher than a degree of priority of the second idle task but lower than a degree of priority of a task other than the pseudo task and the second idle task.

10. The virtual machine control device according to claim 7, wherein the pseudo task generation requester notifies the generation request and the pseudo task finishing requester notifies the finishing request in switching the right of execution of the processor from the first virtual machine to the second virtual machine.

11. The virtual machine control device according to claim 10, wherein in the case where there is an unnotified request for generating the pseudo task in notifying the request for finishing the pseudo task, the pseudo task finishing requester cancels out the generation request and the finishing request.

12. The virtual machine control device according to claim 10, wherein in the case where there is an unnotified request for finishing the pseudo task in notifying the request for generating the pseudo task, the pseudo task generation requester cancels out the finishing request and the generation request.

13. A virtual machine control method to be implemented by a virtual machine control device configured to control a first virtual machine and a second virtual machine, the first virtual machine and the second virtual machine being configured in such a manner that one or more processors are assigned to the first virtual machine, a first operating system is operative in the first virtual machine, one or more processors are assigned to the second virtual machine, and a second operating system is operative in the second virtual machine, the second operating system being provided with an electric power saving controller which controls supply of electric power to the processors, based on usage statuses of the processors, the virtual machine control method comprising:

a pseudo task generation request step of notifying the second operating system of a request for generating a pseudo task which is a task which when operated on one of the processors indicates to the second virtual machine that a task by the first virtual machine is being performed on the one processor, wherein the second operating system generates the pseudo task to be assigned to the one processor, when receiving the notification of the request for generating the pseudo task, and the electric power saving controller of the second operating system, in response to the indication by the pseudo task operated on the one processor, prevents the one processor from being brought to an electric power saving state.

14. A non-transitory computer-readable recording medium which stores a virtual machine control program for functioning a computer as a virtual machine control device for controlling a first virtual machine and a second virtual machine, the first virtual machine and the second virtual machine being configured in such a manner that one or more processors are assigned to the first virtual machine, a first operating system is operative in the first virtual machine, one or more processors are assigned to the second virtual machine, and a second operating system is operative in the second virtual machine, the second operating system being provided with an electric power saving controller which controls supply of electric power to the processors, based on usage statuses of the processors, the virtual machine control program functioning the computer as:

a pseudo task generation requester which notifies the second operating system of a request for generating a pseudo task which is a task which when operated on one of the processors indicates to the second virtual machine that a task by the first virtual machine is being performed on the one processor, wherein the second operating system includes a pseudo task generator which generates the pseudo task to be assigned to the one processor, when receiving the notification of the request for generating the pseudo task, and the electric power saving controller of the second operating system, in response to the indication by the pseudo task operated on the one processor, prevents the one processor from being brought to an electric power saving state.

15. An integrated circuit for use in a virtual machine control device for controlling a first virtual machine and a second virtual machine, the first virtual machine and the second virtual machine being configured in such a manner that one or more processors are assigned to the first virtual machine, a first operating system is operative in the first virtual machine, one or more processors are assigned to the second virtual machine, and a second operating system is operative in the second virtual machine, the second operating system being provided with an electric power saving controller which controls supply of electric power to the processors, based on usage statuses of the processors, the integrated circuit comprising:

a pseudo task generation requester which notifies the second operating system of a request for generating a pseudo task which is a task which when operated on one of the processors indicates to the second virtual machine that a task by the first virtual machine is being performed on the one processor, wherein the second operating system includes a pseudo task generator which generates the pseudo task to be assigned to the one processor, when receiving the notification of the request for generating the pseudo task, and the electric power saving controller of the second operating system, in response to the indication by the pseudo task operated on the one processor, prevents the one processor from being brought to an electric power saving state.

\* \* \* \* \*